(12) United States Patent
Ku et al.

(10) Patent No.: US 11,606,502 B2
(45) Date of Patent: Mar. 14, 2023

(54) MOBILE TERMINAL FOR CAPTURING IMAGE AND CONTROL METHOD THEREOF

(71) Applicant: LG ELECTRONICS INC., Seoul (KR)

(72) Inventors: Hyerim Ku, Seoul (KR); Mijin Cho, Seoul (KR); Kyungrak Choi, Seoul (KR); Jieun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/153,623

(22) Filed: Jan. 20, 2021

(65) Prior Publication Data

US 2022/0053140 A1 Feb. 17, 2022

(30) Foreign Application Priority Data

Aug. 11, 2020 (WO) ................ PCT/KR2020/010603

(51) Int. Cl.
*H04N 5/232* (2006.01)
*G06F 3/04817* (2022.01)
*G06F 3/0486* (2013.01)

(52) U.S. Cl.
CPC ..... *H04N 5/232935* (2018.08); *G06F 3/0486* (2013.01); *G06F 3/04817* (2013.01); *H04N 5/23296* (2013.01); *H04N 5/232127* (2018.08)

(58) Field of Classification Search
None
See application file for complete search history.

(56) References Cited

U.S. PATENT DOCUMENTS

| 10,205,869 | B2 * | 2/2019 | Mori ................. H04N 5/23216 |
| 10,425,575 | B2 * | 9/2019 | Kasa ................. H04N 5/23206 |
| 10,542,128 | B2 | 1/2020 | Kang et al. |
| 10,686,981 | B2 * | 6/2020 | Ito ....................... G06F 3/04847 |
| 11,132,397 | B2 * | 9/2021 | Jang ........................ G06F 16/73 |
| 2009/0213233 | A1 * | 8/2009 | Kido .................... H04N 5/3532 348/208.4 |
| 2010/0304731 | A1 * | 12/2010 | Bratton ............. H04N 5/23206 348/E5.042 |

(Continued)

FOREIGN PATENT DOCUMENTS

| CN | 108391053 | 8/2018 |
| CN | 108668083 | 10/2018 |

(Continued)

OTHER PUBLICATIONS

PCT International Application No. PCT/KR2020/010603, International Search Report dated May 11, 2021, 4 pages.

(Continued)

*Primary Examiner* — Cynthia Segura
(74) *Attorney, Agent, or Firm* — Lee Hong Degerman Kang Waimey

(57) ABSTRACT

Provided is a mobile terminal including a camera, a display, and a controller. The controller is configured to display, on the display, an image identified by the camera, receive a touch input moving from a start position on the display, and capture the image, identified by the camera, based on a distance from a reference location to a position of the touch input.

20 Claims, 18 Drawing Sheets

(56) References Cited

U.S. PATENT DOCUMENTS

| | | | |
|---|---|---|---|
| 2012/0011456 A1* | 1/2012 | Noda | H04N 21/414 |
| | | | 715/847 |
| 2012/0274830 A1* | 11/2012 | Kameyama | H04N 5/232125 |
| | | | 348/E5.037 |
| 2013/0055119 A1* | 2/2013 | Luong | H04N 5/23216 |
| | | | 715/764 |
| 2013/0063645 A1 | 3/2013 | Aoyama | |
| 2014/0016921 A1 | 1/2014 | Choi | |
| 2014/0078371 A1* | 3/2014 | Kinoshita | H04N 5/23206 |
| | | | 348/333.02 |
| 2014/0176774 A1* | 6/2014 | Morimoto | H04N 5/23222 |
| | | | 348/207.99 |
| 2014/0195947 A1* | 7/2014 | Yang | G06F 3/04845 |
| | | | 715/769 |
| 2015/0156552 A1* | 6/2015 | Wayans | H04N 5/772 |
| | | | 386/230 |
| 2015/0229850 A1 | 8/2015 | Lee et al. | |
| 2015/0350535 A1* | 12/2015 | Voss | G06F 3/04883 |
| | | | 348/220.1 |
| 2015/0365587 A1 | 12/2015 | Ha et al. | |
| 2016/0044234 A1* | 2/2016 | Huang | H04N 5/232127 |
| | | | 348/222.1 |
| 2016/0065832 A1* | 3/2016 | Kim | H04N 13/128 |
| | | | 348/207.11 |
| 2016/0127638 A1* | 5/2016 | Guo | G06F 3/04847 |
| | | | 348/333.02 |
| 2016/0191790 A1 | 6/2016 | Wang et al. | |
| 2016/0191791 A1 | 6/2016 | Tokairin | |
| 2017/0010727 A1* | 1/2017 | Jeon | G06F 3/016 |
| 2017/0118402 A1* | 4/2017 | Bok | G06F 3/04883 |
| 2017/0208241 A1* | 7/2017 | Choi | G06F 1/1686 |
| 2017/0223263 A1* | 8/2017 | Kasa | H04N 5/23245 |
| 2017/0244890 A1* | 8/2017 | Lee | H04N 5/907 |
| 2017/0272583 A1* | 9/2017 | Kasa | H04N 5/76 |
| 2018/0203204 A1* | 7/2018 | Suzuki | G03B 13/36 |
| 2018/0227489 A1* | 8/2018 | Ho | H04N 5/23218 |
| 2019/0124255 A1* | 4/2019 | Ueguri | H04N 5/23245 |
| 2019/0379823 A1* | 12/2019 | Uchihara | H04N 5/23227 |
| 2020/0120264 A1* | 4/2020 | Miura | H04N 1/2112 |
| 2020/0169660 A1 | 5/2020 | Kim et al. | |

FOREIGN PATENT DOCUMENTS

| | | |
|---|---|---|
| EP | 2654290 | 10/2013 |
| EP | 3169052 | 5/2017 |
| KR | 1020110129226 | 12/2011 |
| KR | 1020130117032 | 10/2013 |
| KR | 1020150010182 | 1/2015 |
| KR | 1020170006055 | 1/2017 |

OTHER PUBLICATIONS

European Patent Office Application Serial No. 21155598.2, Search Report dated Jul. 13, 2021, 8 pages.

* cited by examiner

FIG. 6
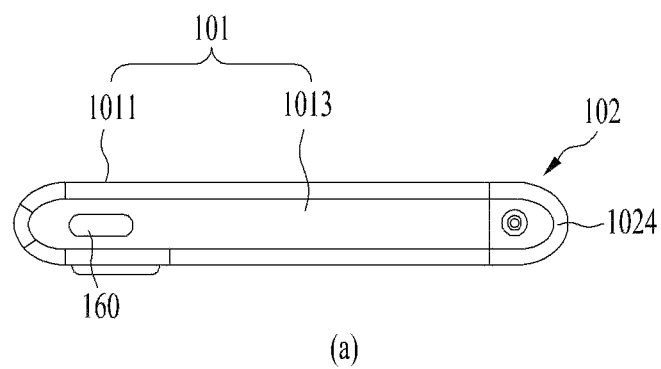
(a)
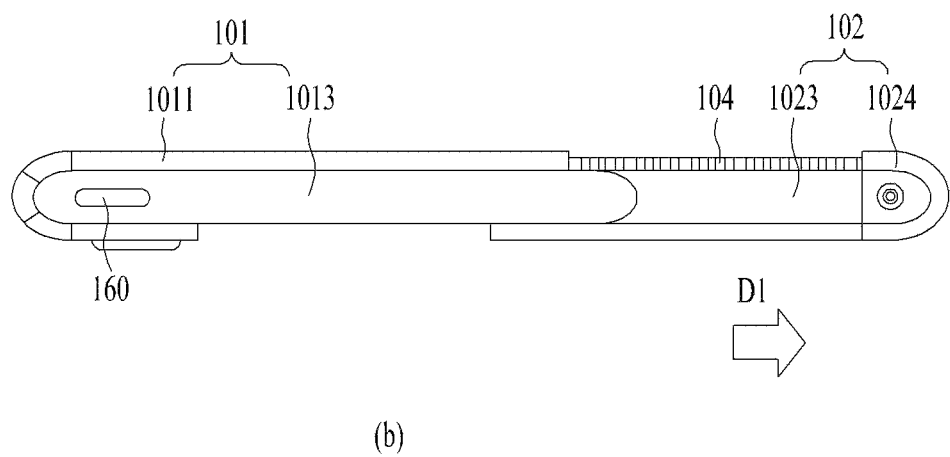
(b)

FIG. 7
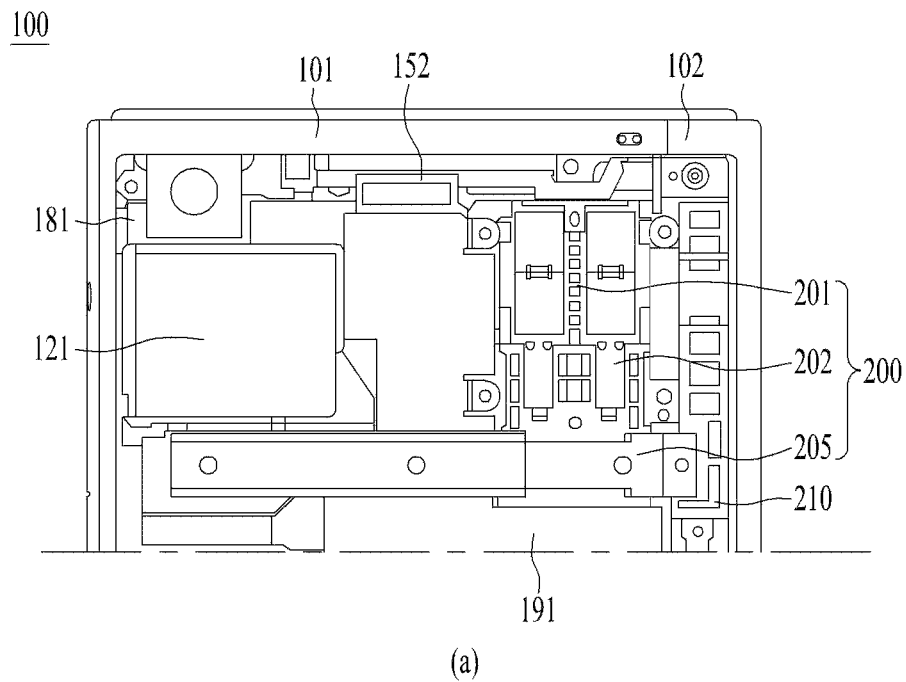
(a)
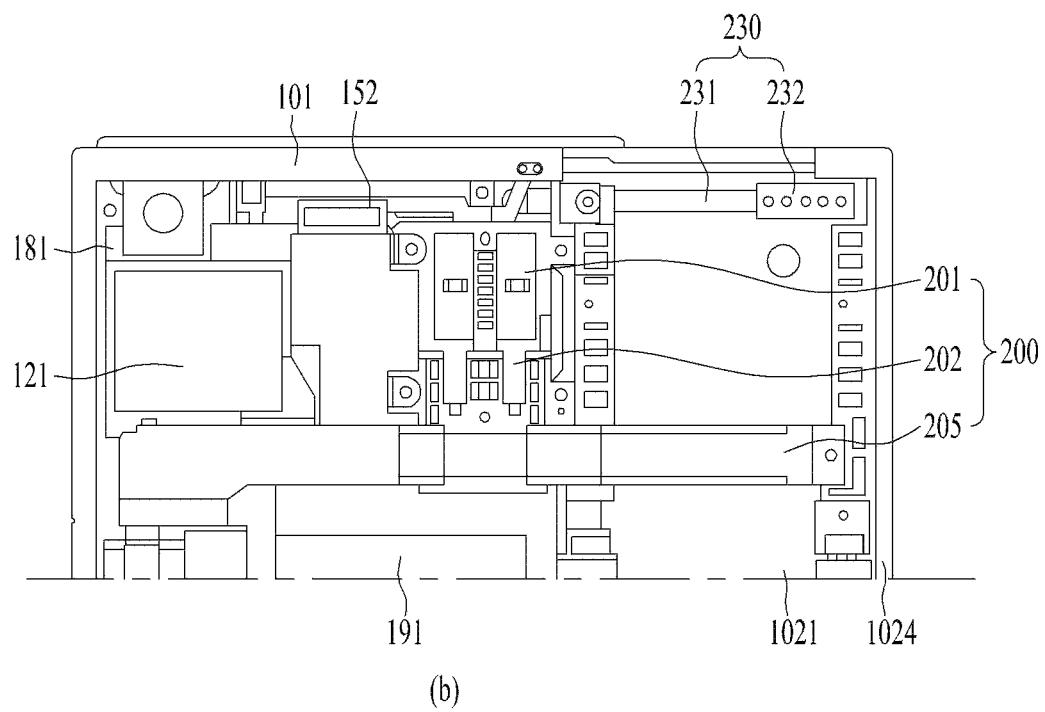
(b)

FIG. 8
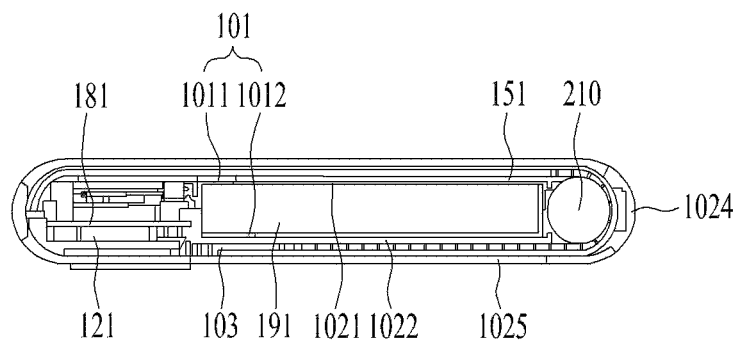
(a)
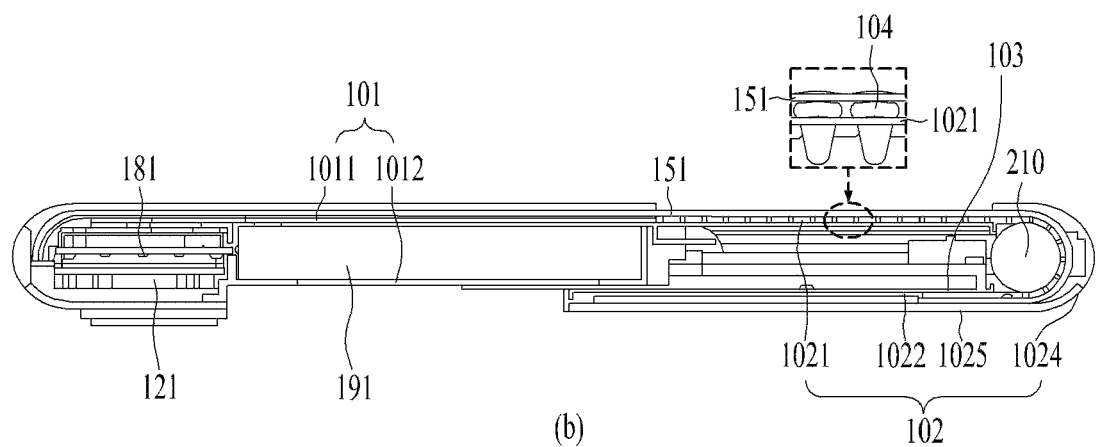
(b)

FIG. 10
1001
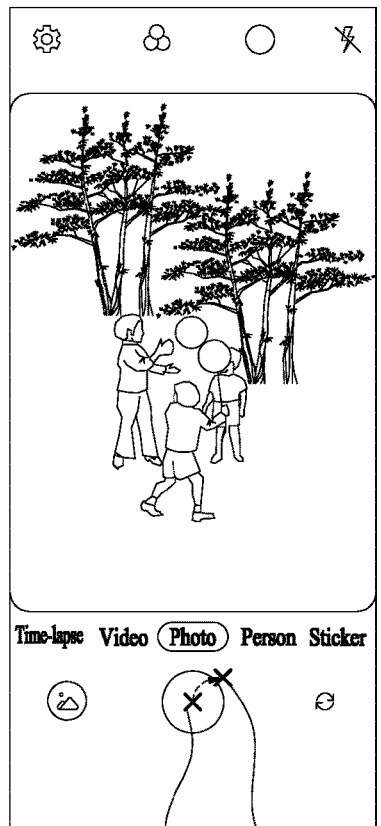
1002
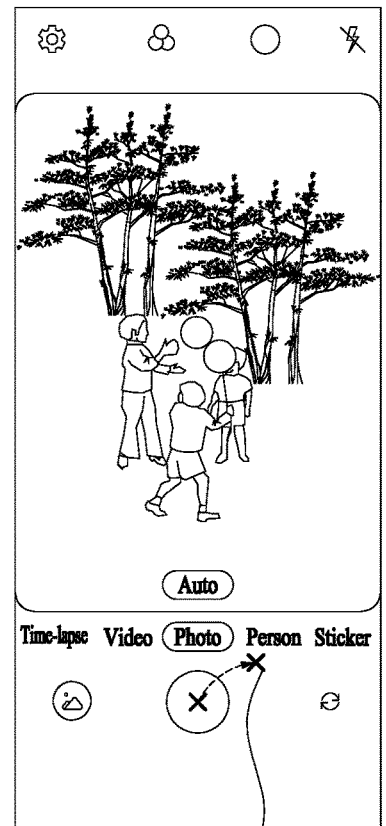
1003
1011
1021  1023
1031

1401  1421  1411

FIG. 15
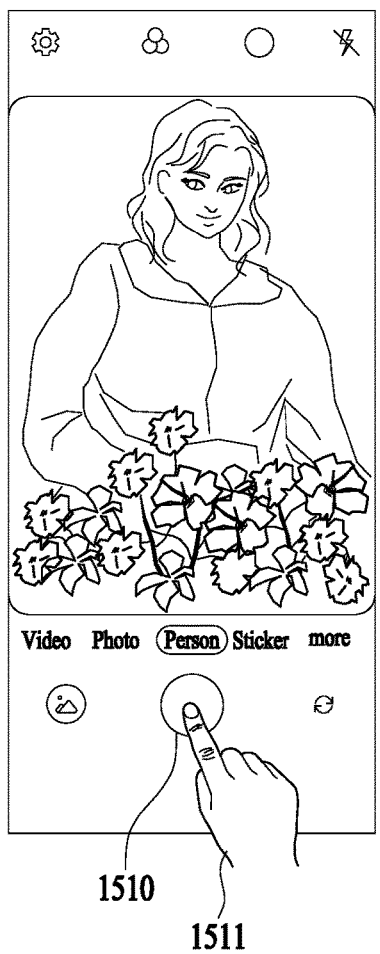
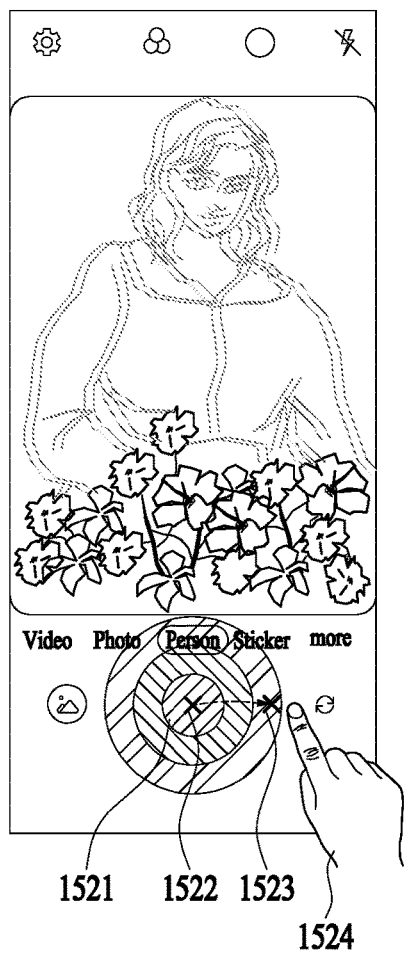
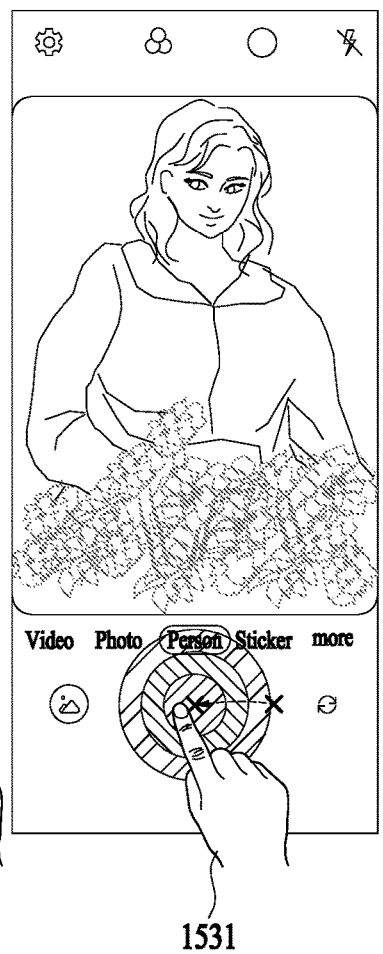

FIG. 16

MOBILE TERMINAL FOR CAPTURING IMAGE AND CONTROL METHOD THEREOF

CROSS-REFERENCE TO RELATED APPLICATION

Pursuant to 35 U.S.C. § 119, this application claims the benefit of an earlier filing date and right of priority to International Application No. PCT/KR2020/010603, filed on Aug. 11, 2020, the contents of which are hereby incorporated by reference herein in its entirety.

BACKGROUND

1. Field

The present disclosure relates to a mobile terminal for capturing an image, identified by a camera, based on movement of a touch input received by the terminal, and a control method thereof.

2. Description of the Related Art

Advances of network technologies and expansions of infrastructures have enabled an electronic device to perform various and professional tasks. For example, based on inclusion of a camera in a mobile terminal, it is possible to use a capture function using the mobile terminal. This capture function has become one of the essential functions of the mobile terminal in that this allows people to conveniently capture an image without a separate camera.

Accordingly, the capture function using the mobile terminal has been being rapidly developed. For example, an image quality provided by the camera included in the mobile terminal is gradually improving, and the mobile terminal provides various shooting experiences to users using an out-focus function, a continuous shooting mode, or a video recording mode.

Currently, mobile terminals provide the above-described camera functions (e.g., the out-focus function, the continuous shooting mode, or the video recording mode) in a fixed form. However, with the popularization of mobile terminals, users have become accustomed to the camera functions described above, and the need to use advanced functions flexibly is increasing.

On the contrary to the increasing need, input methods for mobile terminals may be limited and thus a control method for allowing a user to easily use the various functions is required, and, in addition to simply providing a camera function, there is a need to provide a camera function that can be appropriately utilized according to a user's situation or needs.

SUMMARY

An aspect provides a mobile terminal and a control method thereof, the mobile terminal which allows a function provided using a camera to be controlled more intuitively in response to a moving input, thereby improving convenience of a user regarding a camera function and capturing an image more effectively.

However, the technical goals of the present disclosure are not limited to the above-mentioned goal and further goals not described above will be clearly understood by those skilled in the art.

According to an embodiment, there is provided a mobile terminal including a camera, a display, and a controller, and the controller displays, on the display, an image identified by the camera, receives a touch input moving from a start position on the display, and capture the image, identified by the camera, based on a distance from a reference position to a position of the touch input.

According to another embodiment, there is provided a control method of a mobile terminal including displaying, on a display, an image identified by a camera, receiving a touch input moving from a start position on the display, and capturing the image, identified by the camera, based on a distance from a reference position to a position of the touch input.

BRIEF DESCRIPTION OF THE DRAWINGS

The above and other aspects, features, and advantages of certain embodiments will be more apparent from the following detailed description taken in conjunction with the accompanying drawings, in which:

FIG. 6 illustrates side views of a mobile terminal from a third direction according to an embodiment;

FIG. 7 illustrates a driving part of a mobile terminal according to an embodiment;

FIG. 8 illustrates cross-sectional views taken along lines A-A and B-B of FIG. 2;

FIG. 10 is a diagram illustrating an operation of a mobile terminal according to an embodiment of the present disclosure;

FIG. 15 is a diagram for explaining focus control of a mobile terminal according to an embodiment of the present disclosure;

FIG. 16 is a diagram for explaining depth control of a mobile terminal according to an embodiment of the present disclosure.

DETAILED DESCRIPTION

Figure 1:
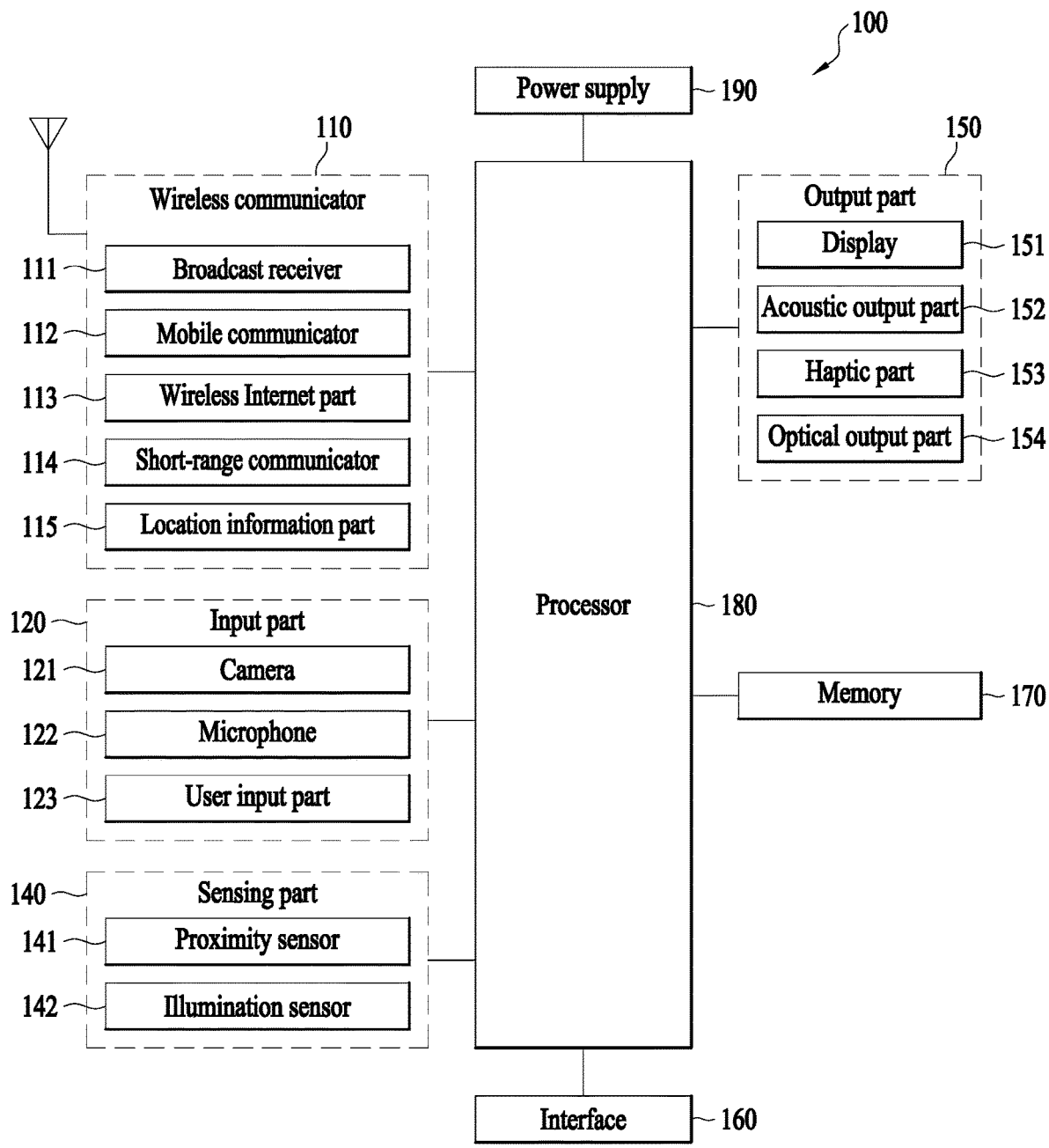
FIG. 1 is a block diagram illustrating a mobile terminal.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. It should be understood, however, that there is no intent to limit this disclosure to the particular example embodiments disclosed. Further, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating a mobile terminal (or electronic device) 100 related to an example embodiment of the present disclosure. The mobile terminal 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic apparatus, so the mobile terminal 100 described herein may have more or fewer components than those listed above.

Specifically, the wireless communication part 110 may include at least one module that enables wireless communication to be performed between the mobile terminal 100 and a wireless communication system, between the mobile terminal 100 and another mobile terminal 100, or between the mobile terminal 100 and an external server. The wireless communication part 110 may include one or more modules that connect the mobile terminal 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may also function as the user input part 123 that provides an input interface between the mobile terminal 100 and a user and simultaneously, provide an output interface between the mobile terminal 100 and the user.

The interface 160 may function as a passage to various types of external devices connected to the mobile terminal 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the mobile terminal 100 may perform an appropriate control associated with the connected external device.

The memory 170 may store data supporting various functions of the mobile terminal 100. The memory 170 may store application programs (or applications) run in the mobile terminal 100, data for operation of the mobile terminal 100, and instructions. At least a portion of the application programs may be downloaded from an external server through wireless communication. Also, at least a portion of the application programs may exist in the mobile terminal 100 for a basic function (for example, call forwarding and outgoing function and message receiving and outgoing function) of the mobile terminal 100 from the time of manufacture. The application program may be stored in the memory 170, installed in the mobile terminal 100, and run by the controller 180 to perform an operation (or function) of the mobile terminal.

The controller 180 generally controls an overall operation of the mobile terminal 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the mobile terminal 100.

The power supply 190 may supply power to each component included in the mobile terminal 100 by receiving external or internal power under a control of the controller 180. The power supply 190 may include a battery such as a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

Figure 2:
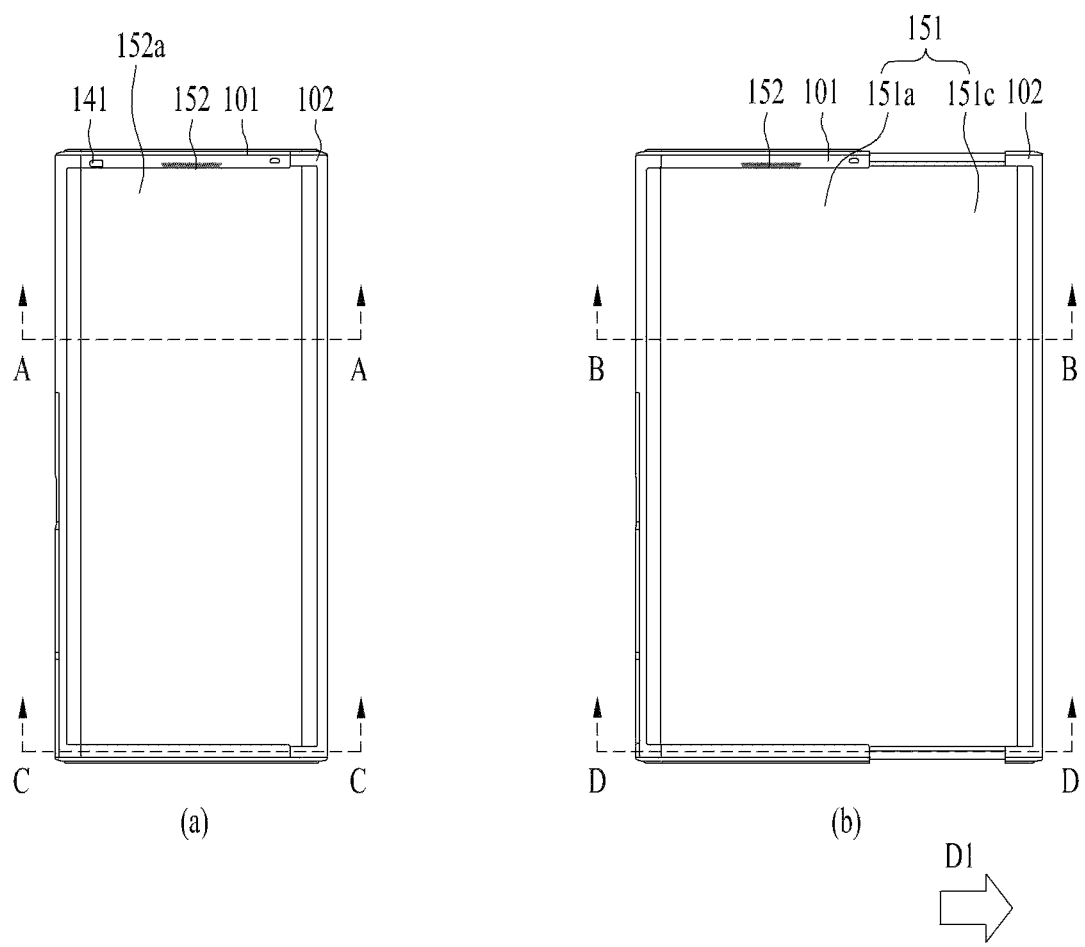
FIG. 2 illustrates front views of a mobile terminal in a first state and a second state according to an embodiment.
Figure 3:
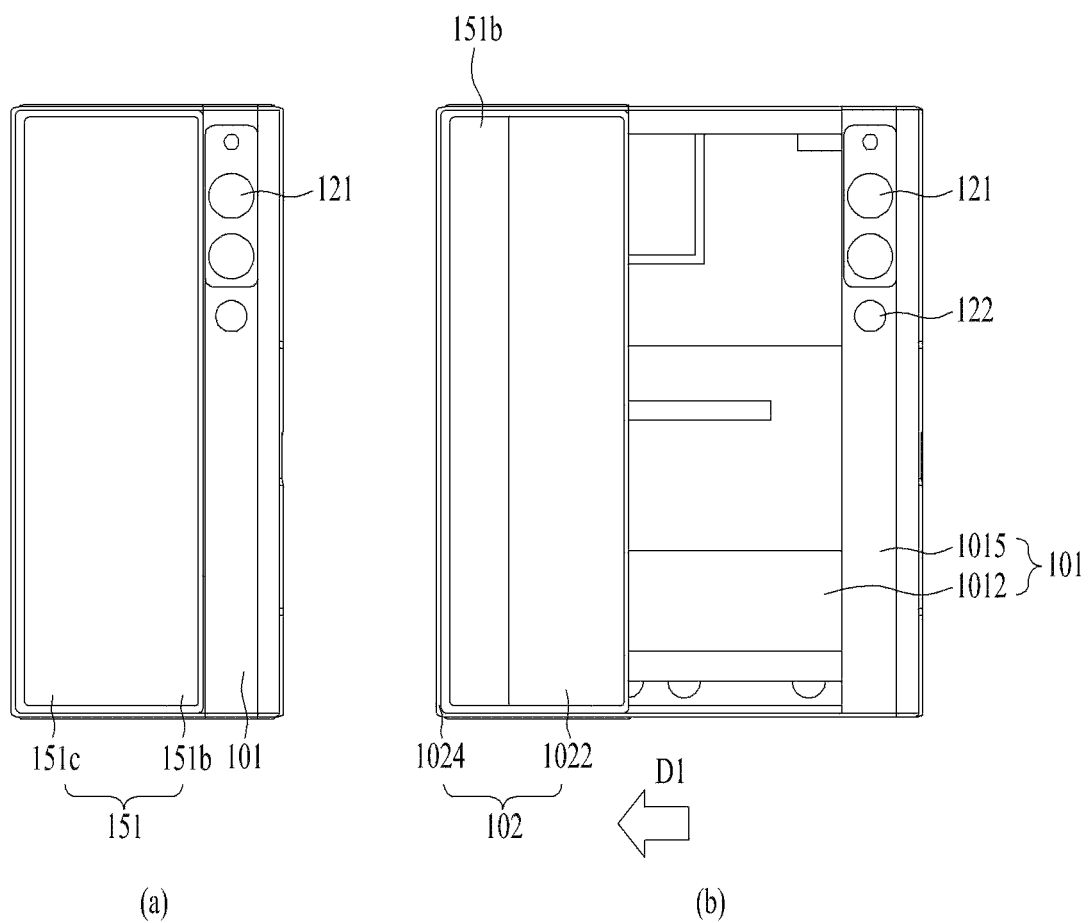
FIG. 3 illustrates rear views of a mobile terminal in a first state and a second state according to an embodiment.

FIG. 2 illustrates front views of a mobile terminal in a first state and a second state, and FIG. 3 illustrates rear views of the mobile terminal in the first state and the second state. (a) of FIGS. 2 and 3 illustrate the first state in which the mobile terminal is retracted. (b) of FIGS. 2 and 3 illustrate the second state in which the mobile terminal is extended.

As illustrated, the mobile terminal 100 in the first state is retracted and has a smaller size when compared to the mobile terminal 100 in the second state. Also, in the first state, a display part or display 151 located at a front side of the mobile terminal 100 may be reduced in size when compared to the second state. The mobile terminal 100 may be extended in a first direction D1 in the first state to enter the second state. In the second state, as shown in (b) of FIG. 2, the size of the mobile terminal 100 and the size of the display 151 located at the front side may increase when compared to the first state. Also, in the second state, the size of the display 151 located at a rear side may be reduced as shown in (b) of FIG. 3. In other words, a display's portion located at the rear side of the mobile terminal 100 in the first state may move to the front side of the mobile terminal 100 in the second state.

In the following description, a direction in which the mobile terminal 100 and the display 151 thereof are extended or enlarged may be referred to as the first direction D1. In addition, a direction in which the mobile terminal 100 and the display 151 thereof are contracted, retracted, or reduced in the second state to enter the first state may be referred to as a second direction D2. Also, a direction vertical to the first direction D1 and the second direction D2 may be referred to as a third direction. The following description may be based on a case in which the first direction and the second direction are horizontal directions and the third direction is a vertical direction. In some cases, based on a placement of the mobile terminal 100, the first direction D1 and the second direction D2 may be vertical directions and the third direction may be a horizontal direction.

The display 151 may use the flexible display 151 to be bent so that a position of the display 151 is changeable. The flexible display 151 may be maintained in a flat state like a typical flat panel display and include a display (e.g., electronic paper) to be curved, bent, folded, twisted, or rolled like a paper. Also, the flexible display 151 may include a lightweight and durable display fabricated on a thin and flexible substrate. The flexible display 151 may be bendable in a predetermined direction like a paper and disposed such that a curvature is changed in the first direction.

The electronic paper may be a display technology based on characteristics of a general ink, and different from the typical flat panel display in using reflected light. The electronic paper may use a twist ball or electrophoresis using a capsule to change information.

In a state in which the flexible display 151 is not deformed (for example, a state having an infinite curvature radius, hereinafter, referred to as a default state), a display area of the flexible display 151 may be a plane. In the default state, when the flexible display 151 is deformed by an external force (for example, a state having a limited curvature radius, hereinafter, a deformed state), the display area may be a curved plane. As illustrated, information displayed in the deformed state may be visual information displayed on the curved plane. The visual information may be implemented by individually controlling light emission of sub-pixels arranged in a matrix form. The sub-pixel may be a minimum unit for implementing one color. When the external force is applied to the flexible display 151, the flexible display 151 may be changed from a flat state which is the default state to a curved state.

The flexible display 151 may implement a flexible touch screen in combination with a touch sensor. In response to a touch being input to the flexible touch screen, the controller 180 of FIG. 1 may perform a control corresponding to the touch input. The flexible touch screen may be configured to sense a touch input even in the deformed state as well as the default state.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The mobile terminal 100 may include a deformation detection means that detects a deformation of the flexible display 151. The deformation detection means may be included in the sensing part 140 of FIG. 1.

The deformation detection means may be provided in the flexible display 151 or a case (a first frame 101 and a second frame 102 described below) to sense information related to the deformation of the flexible display 151. The information related to the deformation may include, for example, a direction in which the flexible display is deformed, a degree of deformation, a deformed position, a deformation time, and an acceleration at which the deformed flexible display 151 is restored. In addition, the information related to the deformation may be various information to be detected in response to the flexible display 151 being bent.

Also, based on the information related to the deformation of the flexible display 151 detected by the deformation detection means, the controller 180 may change information displayed on the flexible display 151 or generate a control signal for controlling functions of the mobile terminal 100.

The deformation of the flexible display 151 may vary based on positions of the first frame 101 and the second frame 102. As illustrated in FIG. 2, since a bent position of the flexible display 151 is determined based on the positions of the first frame 101 and the second frame 102, a front-side exposed area and a bending-deformed position of the flexible display 151 may be calculated based on the positions of the first frame 101 and the second frame 102 instead of the deformation detection means of the flexible display 151.

A state change (to the first state or the second state) of the flexible display 151, for example, a size change of the display 151 occurring at the front side or the rear side of the mobile terminal 100 in response to a size change of the mobile terminal 100 may be manually performed by force applied by a user but not be limited to such a manual manner. For example, when the mobile terminal 100 or the flexible display 151 is in the first state, the mobile terminal 100 or the flexible display 151 may be changed to enter the second state by a command of the user or an application irrespective of the external force applied from the user. To automatically deform the flexible display 151 without applying the external force, the mobile terminal 100 may include a driving part 200 described below.

The flexible display 151 may be rolled and bent 180° with covering a first-direction side portion of the mobile terminal 100. Based on the side portion of the mobile terminal 100, a portion of the flexible display 151 may be located at the front side of the mobile terminal 100 and another portion of the flexible display 151 may be located at the rear side of the mobile terminal 100. For ease of description, the flexible display 151 located at the front side may be referred to as a front-side portion and the flexible display 151 located at the rear side may be referred to as a rear-side portion. The mobile terminal may extend in the first direction or retract in the second direction opposite to the first direction as illustrated in FIG. 2. In this case, an area of the flexible display 151 located at the front side may be changed. In other words, sizes of the front-side portion and the rear-side portion may be changed based on a state change of the mobile terminal.

A portion of the flexible display 151 located at the front side of the mobile terminal 100 may be unmovably fixed to a front side of the first frame 101 while another portion located at the rear side of the mobile terminal 100 is movably provided at the rear side.

The flexible display 151 may be rolled or released at a first-direction side portion of the mobile terminal 100. In this case, a portion located at the rear side of the mobile terminal 100 may be moved to adjust a size of an area of the flexible display 151 located at the front side of the mobile terminal 100. Since the area of the flexible display 151 is set and the flexible display 151 is configured as one continuous body, an area of the rear-side portion may be reduced when an area of the front-side portion is increased. The display 151 may be rolled in the second frame 102 that is movable relative to the first frame 101, for example, on a first-direction side portion of the second frame 102. Also, in order to adjust the area of the display 151 at the front side of the mobile terminal 100, the display 151 may be inserted or pushed into the second frame 102 or withdrawn or pulled out from the second frame 102 while being rolled up at the second frame 102 based on a moving direction of the second frame 102. Such operation will be further described below along with other related components of the mobile terminal 100.

In general, an antenna may be provided in a case or a housing of the mobile terminal 100. However, due to the flexible display 151 that covers the mobile terminal 100 from the front surface to a rear surface thereof, a part for mounting the antenna in the case or housing may be restricted. For this reason, the antenna may be embodied on the flexible display 151. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance. Also, the AOD may transmit or receive a signal directly to or from the display 151. Thus, the AOD may be used in the mobile terminal 100 in which the display 151 is located at both sides as described in the present disclosure.

Figure 4:
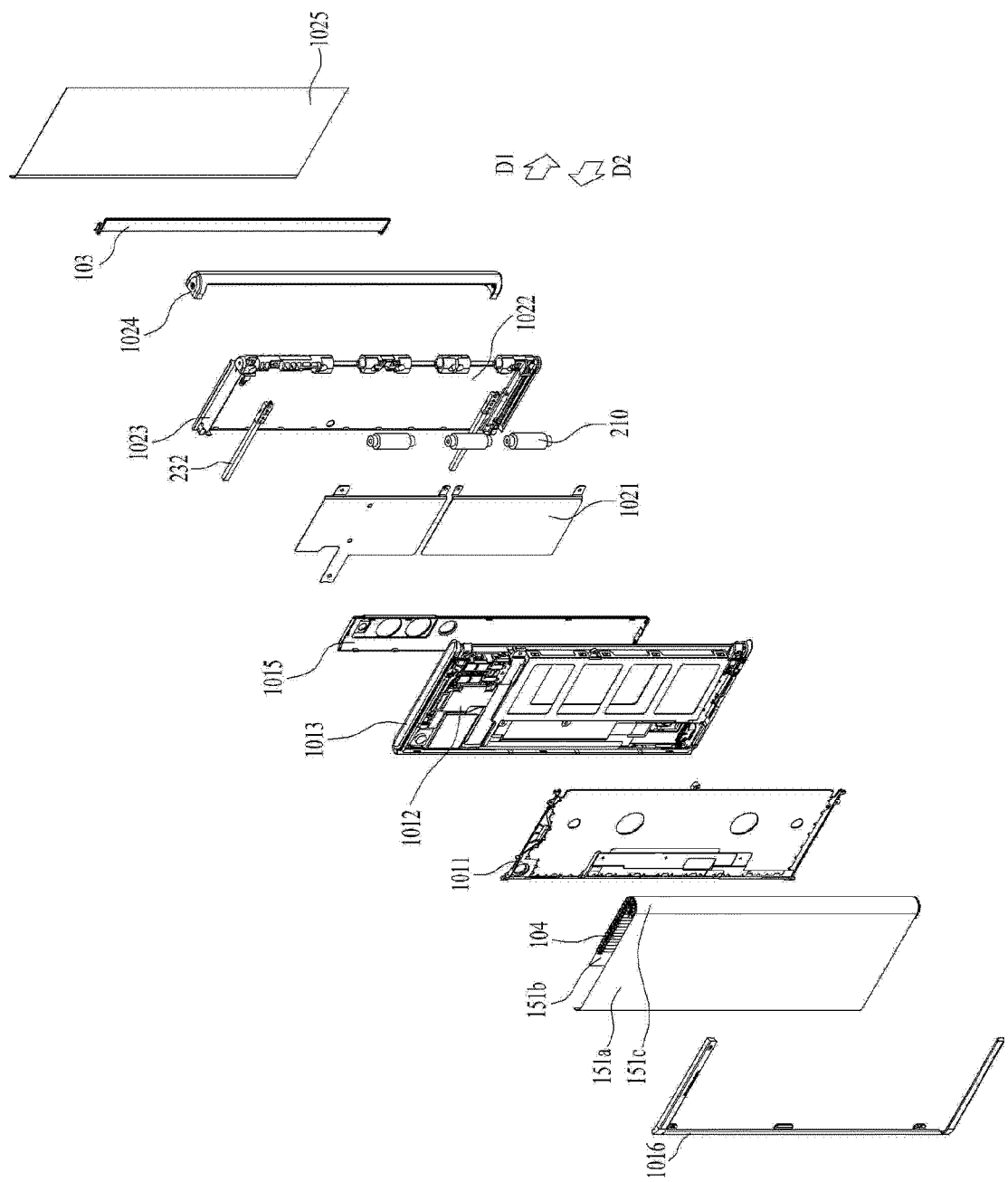
FIGS. 4 and 5 are exploded perspective views illustrating a mobile terminal according to an embodiment.
Figure 5:
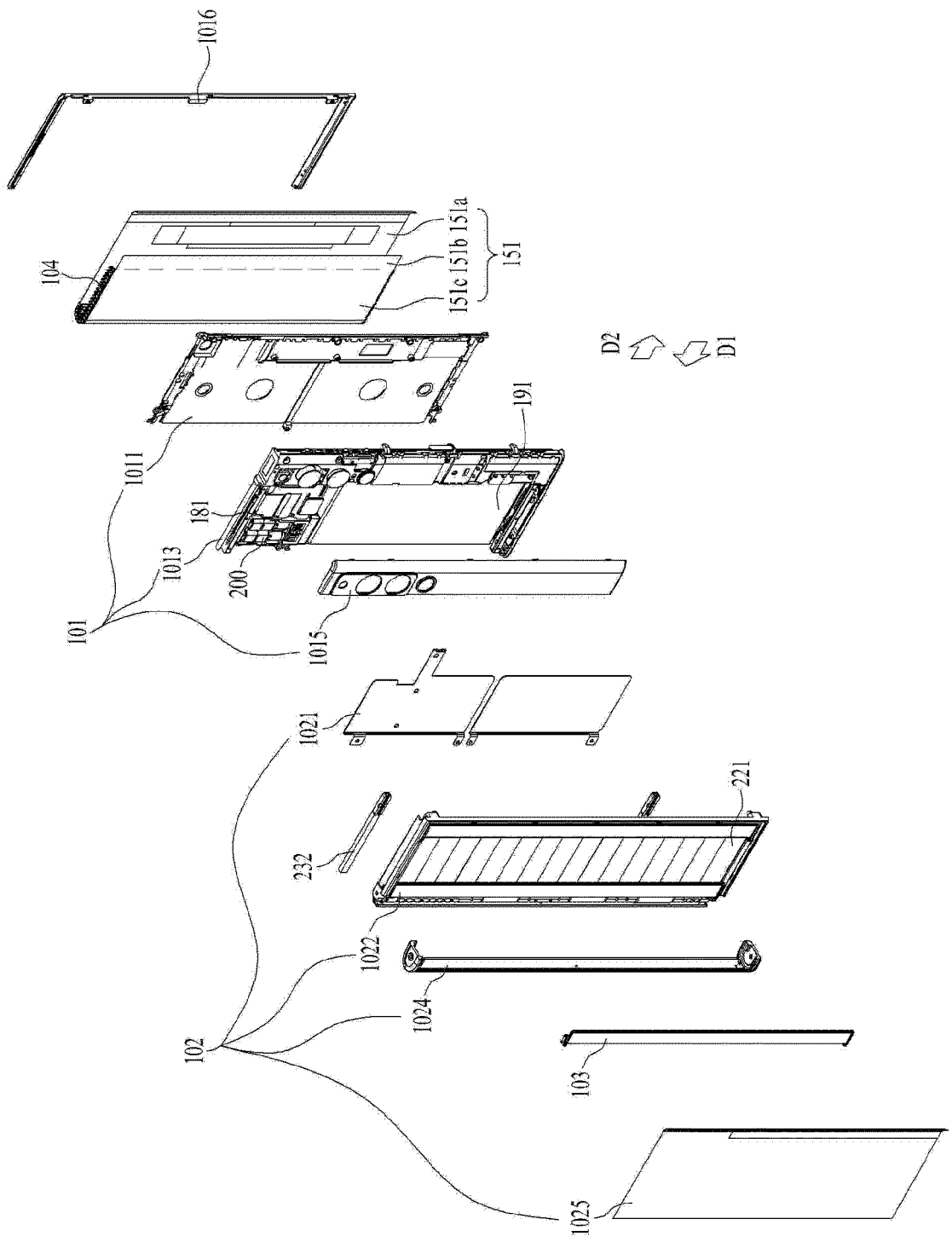

FIGS. 4 and 5 are exploded perspective views illustrating a mobile terminal according to an example embodiment. Specifically, FIG. 4 is an exploded perspective view illustrating a mobile terminal from a front-side direction and FIG. 5 is an exploded perspective view illustrating the mobile terminal from a rear-side direction.

The mobile terminal 100 of the present disclosure may include a frame, for example the first frame 101 and the second frame 102 to mount components therein. As illustrated in FIG. 2, the frame may be changed in size in the first direction. At least one frame may relatively move so as to be changed in size in the first direction. The frame may include an electronic component mounted therein. Also, the flexible display 151 may be located external to the frame.

Since the mobile terminal 100 of the present disclosure includes the flexible display 151, the flexible display 151 may be coupled in a form of covering a front side and a rear side of the frame. The frame may include the first frame 101 and the second frame 102 that moves relative to the first frame 101 in the first direction. The first frame 101 and the second frame 102 may each include a front portion, a rear portion, and a side portion and may be coupled to each other.

The first frame 101 may correspond to a main body of the mobile terminal 100 and have a space for accommodating components between a first front portion 1011 and a first rear portion 1012. Also, the first frame 101 may accommodate, in the space, the second frame 102 that is movably coupled to the first frame 101. Specifically, as illustrated in FIGS. 2 and 5, the first frame 101 may include the first front portion 1011 that is disposed in the front of the mobile terminal 100 to support the front-side portion of the display 151 and the first rear portion 1012 that is disposed in the rear of the mobile terminal 100 so that various components are mounted therein.

The first front portion 1011 and the first rear portion 1012 may be separated in a predetermined distance such that a predetermined space is formed therebetween. Also, the first front portion 1011 and the first rear portion 1012 may be connected by a first side portion 1013. The first side portion 1013 may be integrally formed with the first rear portion 1012 or the first front portion 1011. The camera 121, the acoustic output part 152, an input and output terminal, the controller 180, and the power supply 190 may be accommodated in the space of the first frame 101 as components of the mobile terminal 100. For example, the controller 180 may be a circuit board 181 including an electric circuit and a processor provided to control an operation of the mobile terminal 100. In addition, the power supply 190 may be a battery 191 and related components. Also, the below-described driving part 200 that controls a slide movement of the second frame 102 may be accommodated in the first frame 101.

As described above, the display 151 may have a continuous body and rolled in the mobile terminal 100 to be located both front side and rear side of the mobile terminal 100. The display 151 may include a front-side portion located at the front side of the mobile terminal 100, a rear-side portion located at the rear side of the mobile terminal 100, and a side portion located between the front-side portion and the rear-side portion to cover a side surface of the mobile terminal 100. The front-side portion and the rear-side portion of the display 151 may be flat and the side portion of the display 151 may be curved. When the side portion is bent to form an angle, the flexible display 151 may be damaged. Thus, the side portion may be provided to be bent with a predetermined curvature.

The display 151 may include a fixed portion and a variable portion. The fixed portion may be a portion fixed to a frame. Since the fixed portion is fixed at the frame, a bending degree of the fixed portion may not be changed so that the fixed portion is maintained in a predetermined shape. The variable portion may be a portion in which an angle or position of a bent portion is changeable. The variable portion may require a structure for supporting a rear surface of the variable portion in in accordance with a change in angle or position of the bent portion.

The fixed portion may be coupled to the first frame 101 of the display 151 and located at the front side so as to be a part of the front-side portion. The variable portion may include a side portion located in a direction to a side surface of the mobile terminal. In this case, a position of the side portion may be changed based on a position of the second frame 102. An area located at the front side and an area located at the rear side may be changed in size based on the side portion. For example, based on whether being in the first state or the second state, a portion of the variable portion may be the front-side portion and another portion may be the rear-side portion. The variable portion may be located in the first direction with respect to the fixed portion (e.g., a first area 151a and a second area 151b) based on the mobile terminal 100. An end portion of the variable portion may be bent in a direction to the rear side of the mobile terminal 100 and slidably move on the rear side of the second frame 102.

The end portion of the variable portion of the display 151 may be coupled to a sliding frame 103 that guides the end portion to slide on the rear side of the second frame. The sliding frame 103 may move on the second frame 102 in the first direction simultaneously when the second frame 102 moves in the first direction. As a result, the sliding frame 103 may move relative to the first frame 101 by a distance twice that of the second frame 102. Referring to FIG. 3, the first rear portion 1012 of the mobile terminal 100 may include an exposed rear portion 1015 that is not covered by the display 151 and is exposed outside even in the first state. In the exposed rear portion 1015, various buttons for manipulating the mobile terminal 100, switches, the camera 121, the physical input part 120 such as a flash, and the sensing part 140 such as the proximity sensor 141 and a fingerprint sensor may be arranged. The first rear portion 1012 except the exposed rear portion 1015 may be covered by display 151 in the first state as shown in (a) of FIG. 3 and exposed in the rear-side direction in the second state as shown in (b) of FIG. 3.

A typical bar-type terminal may provide a display on only a front side of the terminal. In such terminal, a main camera may be mounted on a rear side of the terminal to allow a user to capture an object facing a side opposite to the display while the user is viewing the object through the display. To allow the user to capture himself or herself while viewing through the display, another camera may be additionally required on a front side of the terminal.

In the present disclosure, the display 151 may be located at both front side and rear side of the mobile terminal 100. When the user captures himself or herself, the display 151 on the same side as the camera 121, that is, the rear-side portion of the display 151 may be used. When the user captures an object facing the side opposite to the user, the front-side portion of the display 151 located on the side opposite to the camera 121 may be used. Through this, the mobile terminal 100 may capture the user and the object facing the side opposite to the user using the single camera 121. The camera 121 may include a plurality of cameras having different angles of view such as a wide angle, an ultra-wide angle, a telephoto, and the like. In addition to the camera 121, a proximity sensor, an acoustic output part, and the like may be located on the exposed rear portion 1015. Also, the antenna 116 may be installed thereto. In view of exterior design, an exposure decoration may be attached to protect the camera and sensor of the exposed rear portion 1015. In the exposure decoration, a portion corresponding to the camera 121 or the sensing part 140 may be configured to be transparent and another portion may have a predetermined pattern or color in consideration of design so internal components are not be exposed.

The first side portion 1013 may extend along edges of the first front portion 1011 and the first rear portion 1012 to cover a perimeter of the first frame 101 and form an appearance of the mobile terminal 100. As described above, since the second frame 102 is accommodated in the first frame 101 and movably coupled thereto, a portion of the first frame 101 may be open to allow a relative movement of the second frame 102 with respect to the first frame 101.

Referring to FIG. 2, because the second frame 102 is movably coupled to the first frame 101 in the first direction, the first side portion 1013 may not be formed on the first-direction side surface and thus, may be open. Since the first side portion 1013 is exposed external to the mobile terminal 100, the interface 160 for connecting a power port or an ear jack, or the user input part 120 such as a volume button may be disposed therein. When including a metal material, the first side portion 1013 may serve as an antenna.

The second frame 102 may include a second front portion 1021 located in the front of the mobile terminal 100 and a second rear portion 1022 located in the rear of the mobile terminal 100. Like the first front portion 1011 and the first rear portion 1012 of the first frame 101, the second front portion 1021 and the second rear portion 1022 may be formed as substantially flat panel members. The second frame 102 may accommodate various components and may not interfere with the components accommodated in the first frame 101 during the movement. The second front portion 1021 and the second rear portion 1022 may be coupled to each other so that a predetermined space is formed therebetween. Also, the second front portion 1021 and the second rear portion 1022 may be shaped not to interfere with the components included in the first frame 101.

FIG. 6 illustrates side views of the mobile terminal 100 from the third direction. FIG. 6 illustrates the first side portion 1013 of the first frame 101 and a second side portion 1023 of the second frame 102. A first-direction end portion of the second frame 102 may not be exposed outside since the flexible display 151 is located. Also, a second-direction end portion of the second frame 102 may be open to prevent interference with the first frame 101. The second side portion 1023 of the second frame 102 located in the third direction (in the drawings, an upper or lower direction or including both upper and lower directions) may overlap the first side portion 1013 of the first frame 101 not to be exposed outside in the first state. In the second state, however, the second side portion 1023 may be exposed outside because the second frame 102 is pulled out.

The display 151 may be rolled in the second frame 102 and bent at 180° so as to be located at both front and rear sides of the mobile terminal 100. For such arrangement of the display 151, the second frame 102 may include a roller 210 rotatably disposed therein. The roller 210 may be disposed at a predetermined position in the second frame 102. To provide a high-quality display to a user, the display 151 may be flatly spread on the front side and the rear side of the mobile terminal 100. For this, a sufficient tensile force may be provided to the display 151. To provide the sufficient tensile force, the roller 210 may be disposed at the first-direction end portion of the second frame 102. The roller 210 may be extended in the second direction and rotatably coupled to the second frame 102.

The display 151 may be gently bent with a predetermined curvature to be rolled on the roller 210. The flexible display 151 may include a first surface exposed outside to display an image and an inner surface facing a frame on the other side. The roller 210 may be installed in the second frame 102 to be freely rotatable while contacting the inner surface of the display 151. Practically, the roller 210 may move the display 151 in a lateral direction, that is, a direction vertical to a longitudinal direction of the mobile terminal 100. As described below, when the second frame 102 slides, the display 151 having a direction (e.g., the first direction D1 or the second direction D2) different from and relative to the second frame 102 may be moved to the front side or the rear side of the mobile terminal 100 by the tensile force applied from the second frame 102. In this instance, the roller 210 may guide the movement of the display 151 while rotating.

The roller 210 may be disposed adjacent to the first-direction end portion of the second frame 102 and include a side frame 1024 disposed at the first-direction end portion of the second frame 102 to prevent damage to the display 151 rolled on the roller 210.

The side frame 1024 may extend in the longitudinal direction of the second frame 102 (e.g., the third direction) to cover the first-direction side portion, so as to protect the roller 210 and the display 151 rolled thereon. Also, the side frame 1024 may be relocated based on a state of the mobile terminal 100. The side portion may have a predetermined curvature and be rolled by the roller 210. An inner surface of the side frame 1024 may include a curved surface corresponding to the curvature of the side portion.

The side frame 1024 may substantially form an appearance of the mobile terminal 100 along with the first side portion 1013 of the first frame 101. Also, to minimize interference with the components of the first frame 101 during the movement, a second-direction side portion of the second frame 102 may be omitted.

During expansion and retraction in the first direction D1 and the second direction D2, the second frame 102 may overlap the first frame 101, for example, the first front portion 1011 and the first rear portion 1012 of the first frame 101 to prevent the interference with the first frame 101. Specifically, as described above, the display 151 may be coupled to the first front portion 1011 of the first frame 101 and supported by the first front portion 1011. Thus, the display 151 may not be additionally supported by the second front portion 1021 of the second frame 102.

When the second front portion 1021 is located between the first front portion 1011 and the display 151, the display 151 may be deformed or damaged due to a friction with the second front portion 1021 moving repetitively. To prevent this, the second front portion 1021 may be disposed below the first front portion 1011 or inserted between the first front portion 1011 provided as two pieces. The second rear portion 1022 of the second frame 102 may be disposed in a rear-side direction of the first rear portion 1012 of the first frame 101. For example, a front side of the second rear portion 1022 may face a rear side of the first rear portion 1012. Also, to stably support a motion of the second frame 102, the rear side of the first rear portion 1012 may contact the front side of the second rear portion 1022. In such arrangement, the second rear portion 1022 may be exposed external to the first frame 101, for example, external to the first rear portion 1012 and coupled to the display 151.

The second frame 102 may extend and retract in the first and second directions D1 and D2 such that a size of the mobile terminal 100, for example, a size of the front side of the mobile terminal 100 is increased or reduced. In this instance, to obtain the intended first and second states, the display 151 may be moved based on the increased or reduced portion of the front side. When the display 151 is fixed to the second frame 102, the display 151 may not be moved in response to the front side of the mobile terminal 100 being extended or retracted. For this reason, the display 151 may be movably coupled to the second frame 102.

Specifically, the display 151 may include the first area 151a located at the front side of the mobile terminal 100 and the second area 151b coupled to the sliding frame 103 located at the rear side of the mobile terminal 100. The display 151 may also include a third area 151c located between the first area 151a and the second area 151b. The third area 151c may be bent to cover the roller 210 and may move to the front side or the rear side based on a state change of the mobile terminal 100. The sliding frame 103 may be provided as a panel-type member that extends in the longitudinal direction of the mobile terminal 100 (e.g., the third direction) and may be coupled to the second rear portion 1022 to be movable in the first direction D1 and the second direction D2.

The first area 151a, the second area 151b, and the third area 151c may be connected to one another and form a continuous body of the display 151. Also, as described above, to allow the third area 151c to move to the front side or the rear side of the mobile terminal 100 based on a moving direction of the second frame 102, the first area 151a may be unmovably fixed to the front side of the mobile terminal 100 and the second area 151b may be movably provided on the rear side of the mobile terminal 100. Such configuration of the display 151 will be described in detail below.

The first area 151a may be located at the front side of the mobile terminal 100, for example, the front side of the first front portion 1011 of the first frame 101. The first area 151a may be fixed to the front side of the first frame 101, for example, the front side of the first front portion 1011 so as not to move even when the second frame 102 moves. Through this, the first area 151a may always be exposed at the front side of the mobile terminal 100.

The third area 151c may be adjacent to the first area 151a. The third area 151c may extend into the second frame 102 to be rolled on the roller 210. Continually, the third area 151c may extend out of the second frame 102 and partially cover the second frame 102, for example, the rear side of the second rear portion 1022. Meanwhile, since the second frame 102, that is, the second rear portion 1022 is adjacent to the first frame 101, for example, the first rear portion 1012 and forms a rear case of the mobile terminal 100 together, it can be understood that the third area 151c is also arranged at the rear side of the first frame 101.

The second area 151b may be adjacent to the third area 151c and located at the rear side of the mobile terminal 100, for example, the rear side of the second rear portion 1022 of the second frame 102. The second area 151b may be coupled to the sliding frame 103 instead of being coupled directly to the second frame 102.

As a result, the first area 151a may be located at the front side of the mobile terminal 100 to be always exposed at the front side irrespective of the movement of the second frame 102. Also, the second area 151b may be located at the rear side of the mobile terminal 100 to be always exposed at the rear side irrespective of the movement of the second frame 102. The third area 151c may be between the first and second areas 151a and 151b and selectively arranged at the front side or the rear side of the mobile terminal 100 based on the moving direction (e.g., D1, D2) of the second frame 102.

In such a selective arrangement of the third area 151c, since the third area 151c moves to the front side of the mobile terminal 100 and the second rear portion 1022 moves in the first direction D1 in the second state, a first rear portion 1012's portion which is covered by the second area 151b and the third area 151c of the display 151 and the second rear portion 1022 in the first state may be exposed external to the mobile terminal 100. Also, in the first state, the second front portion 1021 of the second frame 102 may be disposed hidden by the first front portion 1011 of the first frame 101. In the second state, however, the second front portion 1021 may be moved out of the first frame 101 to support the third area 151c of the display 151 located at the front side of the mobile terminal 100.

A separating plate may be further provided to prevent the second front portion 1021 from affecting inside components during the sliding movement. The separating plate may be located in a rear-side direction of the second front portion 1021 and coupled to the first front portion 1011. The second front portion 1021 may move between the first front portion 1011 and the separating plate in response to the slide movement of the second frame 102.

The third area 151c may be rolled on the roller 210 in the second frame 102 to be curved. When the first state is changed to the second state, the third area 151c may extend from the second frame 102 to the front side of the mobile terminal 100 while being rolled on the roller 210 in one direction. When the second state is changed to the first state, the third area 151c may be rolled on the roller 210 in a reverse direction to retract from the front side of the mobile terminal 100 to the second frame 102. Simultaneously, the third area 151c may return from the second frame 102 to the rear side of the mobile terminal 100.

An opening-book-type foldable mobile terminal may be repetitively folded at a predetermined position and thus, easily damaged at the position. In contrast, a deformed portion of the flexible display 151, that is, a portion to be rolled on the roller 210 may vary based on the first and second state of the mobile terminal 100, that is, the movement of the second frame 102. As such, the mobile terminal 100 of the present disclosure may significantly reduce deformation and fatigue repetitively applied to a predetermined portion of the display 151 so that the damage to the display 151 is prevented.

Based on the above-described configuration, an overall operation of the mobile terminal 100 will be described as follows. In one example, a state transition may be performed manually by a user, and an operation of the mobile terminal 100 performed during such a manual state transition will be described. However, the below-described operations of the first to third frames 101 to 103 and the display 151 may be equally performed even when a power source other than user's power is used, for example, the driving part 200 is applied as described later.

A rear cover 1025 may be further provided on the rear side of the second rear portion 1022 to prevent an external exposure of the rear-side portion of the display 151 located at the rear side of the mobile terminal 100. When the rear cover 1025 includes a transparent material, the rear-side portion may also be used even in the first state. When an opaque material is used for the rear cover 1025, the rear cover 1025 may cover the sliding frame 103 such that the moving of the sliding frame 103 is not exposed outside. The sliding frame 103 and the second and third areas of the display 151 may move in the first direction and the second direction in a space between the second rear portion 1022 and the rear cover 1025.

FIG. 7 illustrates the driving part 200 of the mobile terminal 100 according to an example embodiment. The mobile terminal 100 of the present disclosure may change a state of the mobile terminal 100 using a method in which a user manually pulls the second frame 102 out of the first frame 101 in the first direction or pushes the second frame 102 into the first frame 101 in the second direction. However, the manual method may cause damage when an excessive force is applied to a main body of the mobile terminal 100. Thus, the mobile terminal 100 may further include the driving part 200 using a motor 201 to stably move the second frame 102 without twisting.

The motor 201 may use the motor 201 that provides a rotating force as illustrated in FIG. 7 and may also use a linear motor that performs a rectilinear motion. To increase the rotating force provided by the motor 201, a diameter of the motor 201 may also be increased. Referring to FIG. 7, two motors 201 may be used to provide a predetermined intensity of driving force or more while preventing an increase in thickness in a restricted space of the mobile terminal 100. The second frame 102 moving too fast may lead to damage or false operation. Thus, a planetary gear may be further provided to reduce the speed of the motor 201 so the motor 201 moves at a stable speed. A planetary gear 202 may serve to amplify or attenuate a number of revolutions of the motor 201 using a plurality of disc gears with different numbers of teeth.

The motor 201 may be fixed to the first frame 101 as shown in (a) of FIG. 7. Also, as shown in (b) of FIG. 7, a position of the motor 201 may be fixed even when the mobile terminal 100 enters the second state in response to the second frame 102 moving in the first direction.

Since the second frame 102 linearly moves in the first direction or the second direction with respect to the first frame 101, a rack and pinion that converts a rotating force of the motor 201 into the linear motion may be used. A pinion gear receiving the rotating force of the motor 201 may be arranged to engage with a rack gear 205 having teeth consecutively arranged in the first direction. The pinion gear may be fixed to the first frame 101 along with the motor 201, and the rack gear 205 may be located at the second frame 102. Conversely, the first frame 101 may also be located at the rack gear 205, and the pinion gear may also be located at the second frame 102 along with the motor 201. Since the pinion gear is caught by the motor 201 so as not to rotate, the second frame 102 may be maintained in the first state and the second state. However, when a large external force is applied, the pinion gear may rotate, which may lead to a displacement of the second frame 102.

Although not shown, a stopper may be further provided to fix a position between the first frame 101 and the rack gear 205 or the second frame 102 so the mobile terminal 100 is fixedly in the first state or the second state. When the motor 201 is driven in response to current being applied, the stopper may be released to allow movement of the second frame 102. When current is not applied so the motor 201 does not rotate, the stopper may be engaged to fix the second frame 102 and a position of the second frame 102.

When the driving part 200 is provided as a pair of driving parts symmetrically disposed in a vertical direction (e.g., the third direction) the driving part 200 may stably move. However, to arrange a battery and the like in consideration of a limited mounting space of the mobile terminal 100, the driving part 200 may be disposed biasedly on one side as shown in (a) of FIG. 7. In some cases, due to such an asymmetric position of the driving part 200, an upper portion and a lower portion of the second frame 102 may move at different speeds so the second frame 102 is twisted. To prevent this, a linear guide 230 may be further provided in the mobile terminal 100.

The linear guides 230 may be provided in both third-direction ends, for example, an upper side and a lower side of the mobile terminal 100 to complement a function of the driving part 200 disposed biasedly on the one side. The linear guide 230 may include a guide rail 231 extended in the first direction and a guide block 232 moving along the guide rail 231. The guide rail 231 may be disposed on the first frame 101 and the guide block 232 may be disposed on the second frame 102, and vice versa. In the present embodiment, the guide rail 231 may be disposed on the second frame 102 to cover upper and lower side surfaces of an extended portion of the second frame 102 in the second state.

The guide block 232 may be coupled to the first frame 101, the guide rail 231 may be coupled to the second frame 102, and then the guide block 232 and the guide rail 231 may be slidably coupled. For the convenience of installation, in a state of the guide block 232 and the guide rail 231 are coupled, the guide block 232 may be fixed to the first frame 101, and then the second frame 102 may be coupled to the guide rail 231.

The guide block 232 may include a guide groove into which the guide rail 231 is inserted. The guide rail 231 may include a rail groove into which a portion of the guide block 232 is inserted. Projections may be formed on a fastening portion of the guide block 232 and the guide rail 231 so the guide rail 231 and the guide block 232 move in the first direction or the second direction without deviating in a thickness direction of the mobile terminal 100. To reduce a friction between the guide block 232 and the guide rail 231, a member formed of a material having a high wear resistance, a low friction resistance, and a self-lubricating property such as polyoxymethylene (POM) or a bearing may be added inside the guide groove.

FIG. 8 illustrates cross-sectional views taken along lines A-A and B-B of FIG. 2. Specifically, (a) of FIG. 8 is a cross-sectional view taken along the line A-A of FIG. 2 and (b) of FIG. 8 is a cross-sectional view taken along the line of FIG. 2. As illustrated in FIG. 2, when the second frame 102 moves in the first direction and enters the second state, the third area 151c located in the rear-side direction may move in the front-side direction. In this case, a structure for supporting the rear side of the third area 151c moved to the front side may be required. The second front portion 1021 located at the front side of the second frame 102 may be located at the rear side of the third area 151c in the second state. However, because the second front portion 1021 may overlap the first front portion 1011 of the first frame 101 in the first state, the first front portion 1011 and the second front portion 1021 may have a level difference therebetween. The level difference between the first front portion 1011 and the second front portion 1021 may create a boundary between the first area 151a and the third area 151c of the flexible display 151. A rolling plate 104 may be used as a support structure for filling a space between the second front portion 1021 and the third area 151c of the flexible display 151.

The rolling plate 104 may be located at the rear side of the flexible display 151 and may have a thickness corresponding to a space between the second front portion 1021 and the flexible display 151 in the second state. As shown in (a) of FIG. 8, in the first state, the rolling plate 104 may be rolled on the roller 210 and located in a direction to the side surface and the rear side of the mobile terminal 100. Also, the flexible display 151 and the rolling plate 104 may be located between the rear cover 1025 covering the rear-side portion of the display 151 and the second rear portion of the second frame 102. As shown in (b) of FIG. 8, when switching to the second state, the rolling plate 104 may move to the front side and thus, located in a front portion of the second frame 102.

The third area 151c in which the rolling plate 104 is located may be a portion in which bending deformation occurs when the first state is changed to the second state. Thus, the rolling plate 104 may be deformed based on the deformation of the third area 151c. Simultaneously, the rolling plate 104 may have a predetermined stiffness such that the flexible display 151 is maintained as being flat when the flexible display 151 is located at the front side or the rear side. As such, the rolling plate 104 may require a structure to be maintained as being flat in the third direction and to be bending-deformable in the first direction.

Figure 9:
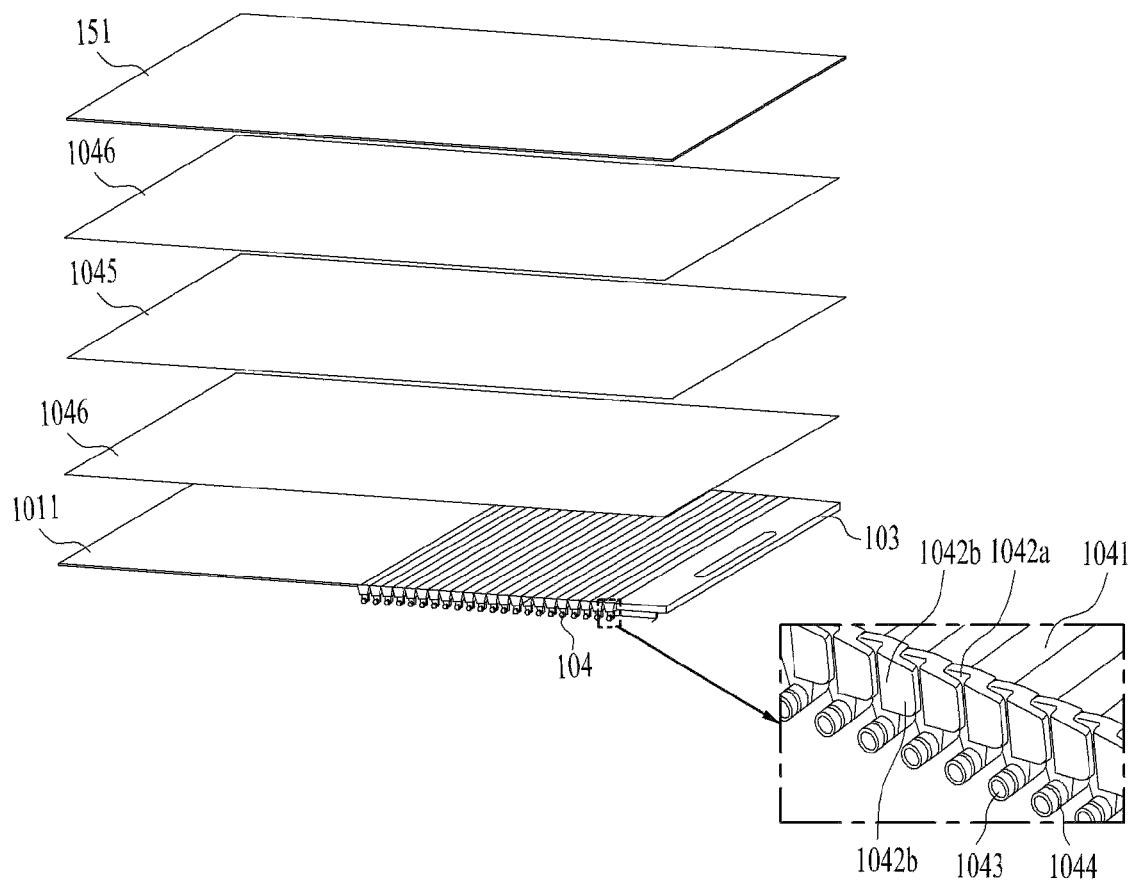
FIG. 9 illustrates a display part and a rolling plate of a mobile terminal according to an embodiment.

FIG. 9 illustrates the rolling plate 104 and the display 151 of the mobile terminal 100 according to an example embodiment. The rolling plate 104 may include a plurality of support bars 1041 extended in the third direction. The plurality of support bars 1041 may be arranged in parallel in the first direction at preset intervals. Through such arrangement, even when the flexible display 151 is rolled on the roller 210 to be bent, the plurality of support bars 1041 may be prevented from interfering with each other. The support bar 1041 may be implemented as an injection-molded object having a predetermined thickness to achieve the stiffness and may include a metal material such as stainless steel (SUS), for example.

The plurality of support bars 1041 may be directly attached to the rear side of the display 151. In this case, however, it may take a long time and a lot of defects, which may decrease productivity. Also, in a case of directly processing the display 151, the display 151 may be easily damaged. To prevent this, the mobile terminal 100 may further include a rolling sheet 1045 to fix the plurality of support bars 1041. The rolling sheet 1045 may include a metal material, and may use a material having ultra-elasticity to be bending-deformed and maintained as being flat after the bending deformation.

For example, an ultra-elastic metal sheet such as a thin STS sheet having a thickness of 0.05 millimeters (mm) or less may be used. To attach the support bar 1041 to the rolling sheet 1045 and attach the rolling sheet 1045 to the rear side of the display 151, an adhesive tape may be applied to both sides of the rolling sheet 1045. The adhesive tape may correspond to the first sheet 1046, for example. However, the present disclosure is not limited thereto, and the first sheet 1046 may be substituted with a different element.

The rolling sheet 1045 may have a kerf pattern in which a groove extending in the third direction is provided in plural in the first direction. The grooves of the kerf pattern may be formed between the plurality of support bars 1041. Also, desirably, the grooves may be formed in a side on which the support bars 1041 are attached to the rolling sheet 1045. The kerf pattern may be formed in a wedge shape such that a size is large in a surface part of the rolling sheet 1045 and narrowed gradually.

Instead of using the rolling sheet 1045, a material having elasticity such as silicon may be disposed between the support bars 1041 to couple the neighboring support bars 1041 so an angle between the support bars 1041 varies. An elastic connecting part may be bent at a position corresponding to the roller 210 and if located at the front side or the rear side, may stretch so that the support bars 1041 are arranged to form a plane.

The support bars 1041 may form a flat plane corresponding to the rear side of the display 151. Also, as shown in (b) of FIG. 8, the support bars 1041 may form a curved plane with a predetermined curvature. The support bars 1041 of the curved plane may be in close contact with a curved surface of the roller 210 when the rolling plate 104 is rolled on the roller 210.

In some cases, the support bars 1041 may form a plane having one flat surface in contact with the display 151 and the other surface curved with a curvature corresponding to the curvature of the roller 210. In such cases, the support bars 1041 may have maximal thicknesses at a first-directional end and a second-directional end and have a minimum thickness at a center.

The rolling plate 104 may be located at a position corresponding to the third area 151c, and rolled and bent over the roller 210 to span the front side and the rear side. The rolling plate 104 may be connected to the first front portion 1011 of the first frame 101 in the front-side direction and connected to the sliding frame 103 in the rear-side direction. In order for the flexible display 151 to form a continuous surface without a level difference, the first front portion 1011 of the first frame 101 located at the rear side of the first area 151a, the sliding frame 103 located at the rear side of the second area 151b, and the rolling plate 104 located at the rear side of the third area 151c may contact the display 151 at the same height. For example, since the sliding frame 103 moves on the rear side of the mobile terminal 100 and moves in the same space as the rolling plate 104, the rolling plate 104 may have a thickness corresponding to that of the sliding frame 103.

FIG. 10 is a diagram illustrating an operation of a mobile terminal according to an embodiment of the present disclosure.

Reference numeral 1001 in FIG. 10 indicates a case where an image identified by a camera is displayed on a display. According to reference numeral 1001, the image identified by the camera may be displayed on one area of the display, and at least one icon (or content) related to control of the camera may be displayed on another area.

Here, the image identified by the camera may include a preview image identified based on execution of the camera. At least one icon related to the control may include, for example, an icon for setting the camera, an icon for setting a flash, an icon for setting a timer, an icon for changing a mode, an icon for switching operations between a front camera and a rear camera, an icon for executing an album application including a captured image, or a first icon 1011 for triggering image capturing.

According to an embodiment, the first icon 1011 may be referred to as a shutter icon, but not limited thereto.

In an embodiment, when a touch input of clicking the first icon 1011 is received, an image identified by the camera may be captured. In some cases, a moving input (or a moving touch input, or a drag input) may be received in regard to the first icon 1011. In this case, an image may be captured based on a moving distance of the input, and a detailed description related thereto will be described later.

Referring to reference numeral 1002, a touch input moving from a start position 1021 may be received. For example, the touch input may include an input moving from the start position 1021 to a first position 1023. The first position 1023 may include a current position (or a final position) of the touch input.

When a touch input moving from the start position 1021 is received, the mobile terminal may capture an image, identified by a camera, based on a distance from a reference position to a position of the touch input, that is, the first position 1023 which is the current position of the touch input.

Meanwhile, the start position 1021 may correspond to a position from which a user's touch input starts, and the reference position may be predetermined. Meanwhile, the start position 1021 may include an arbitrary position within the first icon 1011, but not limited thereto. The reference position may correspond to the start position 1021, but not limited thereto, and may be, for example, a fixed position on the display or an arbitrary position on the display. More specifically, the reference position may be an arbitrary position within an area where the first icon 1011 is displayed.

In an embodiment, when the distance between the reference position and the first position 1023 is a first distance, the mobile terminal may capture an image, identified by the camera, at a first cycle. When the distance between the reference position and the first position 1023 is a second distance, the mobile terminal may continuously capture an image, identified by the camera, at a second cycle. Here, a cycle for each distance between the reference position and the first position 1023 (or a distance range) may be predetermined.

However, the present disclosure is not limited thereto, and a capture cycle may be set in inverse proportion to or in proportion to the distance between the reference position and the first position 1023. For example, the capture cycle may be set to be shorter as the distance between the reference position and the first position 1023 is longer. For another example, the capture cycle may be set to be longer as the distance between the reference position and the first position 1023 is longer.

In an embodiment, when the distance between the reference position and the first position 1023 is the first distance, the mobile terminal may capture an image, identified by the camera, with a depth of field corresponding to a first value. When the distance between the reference position and the first position 1023 is a second distance, the mobile terminal may capture an image, identified by the camera, with a depth of field corresponding to a second value. Here, a value for a depth of field for each distance (or distance range) between the reference position and the first position 1023 may be predetermined. In an embodiment, adjustment of the depth of field may be possible both in a hardware process using an aperture of the camera and in a software process using image processing.

Here, the depth of field indicates a range of space within which the camera is in focus, and when the range in focus is wide, it may be said that the depth of field is deep, and when the range in focus is narrow, it may be said the depth of field is shallow. A value for the depth of field indicated in the present disclosure may correspond to a value indicating that the depth of field is deep or shallow. Since those skilled in the art appreciate the depth of field, a more detailed description will be omitted.

Reference numeral 1003 indicates a case where a position of a touch input corresponds to a second position 1031. A distance between a reference position and a second position 1021 may be longer than a distance between the reference position and a first position 1023 in reference numeral 1002.

The distance between the reference position and the second position 1021 may be greater than or equal to the first distance. In this case, the mobile terminal may capture an image based on a moving speed of an object included in a displayed image. Here, the first distance may be predetermined.

In an embodiment, when the distance between the reference position and the second position 1021 is greater than or equal to the first distance, the mobile terminal may capture a displayed image based on a cycle corresponding to a moving speed of at least one of objects included in the displayed image. In this case, when a moving speed of an object included in the displayed image is greater than or equal to a specific speed, an image capture cycle may be set to the first cycle, and when a moving speed of an object included in the display image is less than the specific speed, the image capture cycle may be set to the second cycle (the second cycle may be longer than the first cycle). In this case, a more number of images may be captured at the first cycle than at the second cycle.

However, the present disclosure is not limited thereto, and a capture cycle may be set in inverse proportion to a moving speed of an object included in an image. For example, a capture cycle may be set to be shorter as a moving speed of an object is faster. Meanwhile, in an embodiment, when there is a plurality of objects in an image, a capture cycle may change to correspond to a moving speed of an object selected by a user's input or a moving speed of a specific object suggested by the terminal. Suggesting the specific object by the terminal is based on a technology utilized in auto-focusing and the like, by which the terminal may select and suggest an object located at a point in focus.

In an embodiment, when the distance between the position of the touch input and the reference position is greater than or equal to the first distance, the mobile terminal may display information indicating the same. For example, an icon with a text "Auto" may be displayed, as shown in reference numeral 1003. However, the present disclosure is not limited thereto, and information may be provided in various forms or in various ways.

Figure 11:
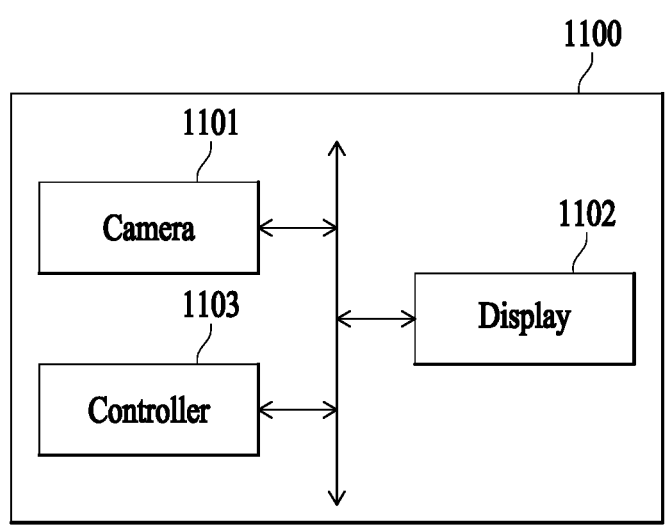
FIG. 11 is a functional block diagram of a mobile terminal according to an embodiment of the present disclosure.

FIG. 11 is a functional block diagram of a mobile terminal according to an embodiment of the present disclosure. An element of a mobile terminal 1100 which is to be described later refers to a unit of processing at least one function or operation, and may be implemented in hardware or software or in combination of the hardware and the software.

Referring to FIG. 11, the mobile terminal 1100 may include a camera 1101, a display 1102 and a controller 1103.

The camera 1101 may identify an image and capture the identified image. In some cases, the camera 1101 may include a plurality of cameras having different angles of view. In this case, at least one camera may be operated to identify an image under the control of the controller 1103 which is to be described later. In addition, the camera 1101 may correspond to the camera 121 of FIG. 1.

The display 1102 may display the image identified by the camera 1101. For example, based on execution of the camera 1101, the display 1102 may display the identified image. Together with the image, the display 1102 may display an icon for controlling the camera 1101, for example, an icon for capturing an image.

The display 1102 may display a variety of information related to operations of the mobile terminal 1100. For example, based on execution of an application identified by the camera 1101, the display 1102 may display contents of the application. Here, the contents of the application may include a variety of contents, which are provided upon the execution of the application and related to functions of the application. In addition, in an embodiment, the display 1102 may include a touch screen and may detect a touch input received on the display 1102.

The display 1102 may be arranged such that a size thereof to be exposed on a first side of the mobile terminal 1100 (for example, a front side of the mobile terminal 1100) changes. The size of the display 1102 to be exposed on the first side of the display 1102 may be changed based on a control of the controller 1103 which is to be described later.

In an embodiment, a portion of the display 1102 may be located at the first side of the mobile terminal 1100 and the other portion thereof may be located at the other side of the mobile terminal 1100 (for example, a rear side of the mobile terminal 1100, and a lateral side of the mobile terminal 1100). For example, a first area of the display 1102 may be located at the first side of the mobile terminal 1100, and a second area of the display 1102 may be located at the second side opposite to the first side. For another example, a first area of the display 1102 may be located at the first side of the mobile terminal 1100, and at least a portion of a second area of the display 1102 may be located at a third side which is rolled on one side of the mobile terminal 1100 to be located between the first side and the second side.

In an embodiment, a portion of the display 1102 may be located at the first side and the other portion thereof may be rolled on one side of the mobile terminal 1100 to be located at the second side of the mobile terminal 1100. Specifically, the display 1102 may be bent at one end in contact with the first side, and at least a portion of the display 1102 may be located at the first side while at least another portion thereof may be located at the second side in contact with the one end. However, the present disclosure is not limited thereto, and the display 1102 may be divided into a plurality of areas connected using a hinge, such that area is located to be fixed to the first side while the other area is located at the first side or the second side based on driving of the hinge.

The controller 1103 may control the mobile terminal 1100 or elements of the mobile terminal 1100. For example, the controller 1103 may control an operation of the camera 1101 or the display 1102 by executing a command or application program stored in a memory.

The controller 1103 may display, on the display 1102, an image identified by the camera 1101. For example, the controller 1103 may drive the camera 1101 in response to execution of an application related to the camera 1101, so that an image identified by the camera 1101 is displayed on at least a portion of the display 1102.

The controller 1103 may receive an input moving from a start position on the display 1102. The moving input may include continuous touch inputs, and specifically, the controller 1103 may receive a touch input moving from the start position on the display 1102 to another position. The start position may be a preset position on the display 1102 and may correspond to, for example, a position at which a first icon (for example, a shutter icon) is displayed. The input may include, for example, a drag input, but not limited thereto.

The controller 1103 may capture an image, identified by the camera 1101, based on a distance from a reference position to a position of a touch input. In an embodiment, the controller 1103 may identify a current position of an input relative to the reference position and capture an image, identified by the camera 1101, based on a distance from the reference position to the current position of the input. The captured image may correspond to an image identified by the camera 1101 at a capture timing (or an image displayed on the display 1102). Here, the reference position may correspond to the start position, may be a fixed position on the display 1102 or an arbitrary position on the display 1102.

A more detailed description related to the start position, the reference position, and the position of the touch input may be described with reference to FIG. 13.

In an embodiment, the start position may not be predetermined and instead may refer to a first position that is a starting point with regard to an input moving from the first position to the second position (for example, a drag input). When the start position is within the first area in which the first icon is displayed, the controller 1103 may capture an image, identified by the camera, based on a distance from the reference position to the position of the touch input.

For example, in response to receiving an input moving from the start position, the controller 1103 may identify whether the start position is included in the first area where the first icon is displayed. When the start position is included in the first area where the first icon is displayed, the controller 1103 may capture an image, identified by the camera, based on a distance from the reference position to a position of the touch input. If the start position is not included in the first area where the first icon is displayed, the controller 1103 may not capture an image.

Here, the first icon may include, for example, a shutter icon that triggers image capturing. However, the present disclosure is not limited thereto, and the first icon may include a snapshot icon. The snapshot icon is an icon displayed based on receiving a specific input, and a specific example thereof may be described with reference to FIG. 18.

In an embodiment, the controller 1103 may capture an image, identified by the camera 1101, based on a cycle corresponding to a distance from a reference position to a position of a touch input. For example, when the distance from the reference position to the position of the touch input is a first distance, the controller 1103 may continuously capture the images at a first cycle. When the distance from the reference position to the position of the touch input is a second distance, the controller 1103 may capture the image at a second cycle.

For another example, the controller 1103 may identify a cycle corresponding to the distance from the reference position to the position of the input within a predetermined cycle range, and capture the image at the identified cycle. In this case, the identified cycle may become short to correspond to the distance from the reference position to the position of the touch input. That is, as the distance between the reference position and the position of the touch input is longer, the image may be captured at a shorter cycle. However, the present disclosure is not limited thereto, and the cycle may become longer to correspond to the distance from the reference position to the position of the touch input according to an embodiment.

In an embodiment, when a distance from a reference position to a position of the touch input is greater than or equal to the first distance, the controller 1103 may capture a displayed image based on a cycle corresponding to a moving speed of an object included in the displayed image. Specifically, when the distance from the reference position to the position of the touch input is greater than or equal to the first distance, the controller 1103 may identify a moving speed of an object included in the displayed image. The controller 1103 may identify a cycle corresponding to the identified moving speed and capture the displayed image at the identified cycle.

For example, when the distance from the reference position to the position of the touch input is greater than or equal to the first distance, the controller 1103 may identify an object included in the image. The controller 1103 may identify a position change of the identified object during a predetermined time period. The controller 1103 may identify the moving speed of the object based on the position change of the identified object, and capture the image at a cycle corresponding to the moving speed of the object. In this case, an image capture cycle for each moving speed of an object may be predetermined, and various methods that are well-known for a person skilled in the art may be used as a method of identifying a moving speed of an object.

For example, when a moving speed of an object is a first speed, the controller 1103 may capture an image at a first cycle (or a first time interval), and when the moving speed of the object is a second speed (faster than the first speed), the controller 1103 may capture an image at a second cycle (or a second time interval). The first cycle may correspond to, for example, 0.55 seconds and the second cycle may correspond to, for example, 0.08 seconds, but not limited thereto.

For another example, the controller 1103 may capture an image in inverse proportion to a moving speed of an object within a specific cycle range. In this case, the image capture cycle may be shorter as the moving speed of the object is faster. The specific cycle range may include, for example, a range of 0.08 seconds to 0.55 seconds, but not limited thereto.

In an embodiment, when a distance from a reference position to a position of a touch input is greater than or equal to the first distance, the controller 1103 may capture a displayed image based on a cycle corresponding to a remaining capacity of a memory for storing images. For example, when the remaining capacity of the memory is a first capacity, the image may be captured at a first cycle, and when the remaining capacity of the memory is a second capacity, the image may be captured at a second cycle. Here, the first capacity may be smaller than the second capacity, and the first cycle may be longer than the second cycle. That is, when the remaining capacity of the memory is small, the image may be captured at a longer cycle. Meanwhile, in an embodiment, the controller 1103 may display at least one of: a number of images that can be captured to correspond to a distance from a reference position to a touch input; information regarding a time for which images can be captured continuously; and information regarding the remaining capacity of the memory.

In an embodiment, the controller 1103 may display, on the display 1102, information regarding a capture cycle according to a distance from a reference position. For example, the controller 1103 may display information regarding a capture cycle for each distance between the reference position and a current position of a touch input, that is, capture cycle information. The capture cycle information may be, for example, in the form of a concentric circle and may include contents in which a cycle for each distance range is displayed, and a specific example thereof may be described with reference to FIG. 13 or FIG. 14. However, the present disclosure is not limited thereto, and the capture cycle information may be displayed in any of various forms.

In an embodiment, the controller 1103 may adjust a focus of the camera 1101 in response to a direction of a touch input. For example, when the direction of the touch input is a first direction, the controller 1103 may adjust the focus of the camera 1101 to correspond to an object located in the first area of the image. When the direction of the touch input is a second direction, the controller 1103 may adjust the focus of the camera 1101 to correspond to an object located in the second area of the image.

In an embodiment, the mobile terminal 1100 may include a depth camera that obtains information regarding a depth of field of an image. In this case, the controller 1103 may use the depth camera to identify an object located at a front side and an object located at a rear side in an image identified by the camera 1101. In response to a direction of a touch input, the controller 1103 may adjust the focus of the camera 1101 to correspond to the object located at the front side or the object located at the rear side.

For example, when the direction of the touch input is the first direction (for example, the left direction), the controller 1103 may adjust the focus of the camera 1101 to correspond to an object located at the front side (or an area within a first distance from the mobile terminal 1100). When the direction of the touch input is in the second direction (for example, the right direction), the controller 1103 may adjust the focus of the camera 1101 to correspond to an object located at the rear side (or an area out of the first distance from the mobile terminal 1100). A specific example thereof may be described with reference to FIG. 15.

In an embodiment, the controller 1103 may capture an image based on a depth of field corresponding to a distance from a reference position to a position of a touch input. For example, when the distance from the reference position to the position of the touch input is the first distance, the controller 1103 may capture the image with a first depth-of-field value, and when the distance from the reference position to the position of the touch input is the second distance, the controller 1103 may capture the image with a second depth-of-field value. For another example, the controller 1103 may capture an image based on a depth of field corresponding to a distance from a reference position to a position of a touch input within a predetermined range of depth-of-field values. A specific example thereof may be described with reference to FIG. 16.

Here, a depth of field indicates a range of space where a camera can focus, and when the range in focus is wide, it may be said that the depth of field is deep (or the depth-of-field value is large), and when the range in focus is narrow, it may be said the depth of field is shallow (or the depth-of-field value is small). In addition, in some cases, the depth of field may indicate an out-of-focus degree of an image. Since the foregoing description is apparent to a person skilled in the art, a more detailed description will be omitted.

In an embodiment, the controller 1103 may zoom in or out a displayed image according to a moving direction of a touch input. For example, when the moving direction of the touch input is the first direction, the controller 1103 may zoom in the image, and when the moving direction of the touch input is the second direction, the controller 1103 may zoom out the image. In this case, a zoom-in degree and a zoom-out degree may correspond to a moving distance. For example, when the touch input moves by the first distance in the first direction, the controller 1103 may zoom in the image 1.1 times, and when the touch input moves by the second distance (exceeding the first distance) in the first direction, the controller 1103 may zoom in the image 1.2 times. When the touch input moves by the first distance in the second direction, the controller 1103 may zoom out the image 0.9 times, and when the touch input moves by the second distance (exceeding the first distance) in the second direction, the controller 1103 may zoom out the image 0.8 times. A specific example related thereto may be described with reference to FIG. 17.

In an embodiment, the controller 1103 may set the camera 1101 to a video recording mode for recording a video. When receiving a first input in the video recording mode, the controller 1103 may acquire a video having a first length of time (for example, 2 seconds). In some cases, in response to receiving the first input, the controller 1103 may acquire a video having the first length of time for a second time (for example, 60 seconds). In this case, a plurality of videos each having the first length of time may be acquired. The first input may include a predetermined input to the first icon, for example, a long press or a long touch input.

In an embodiment, the controller 1103 may receive a moving touch input in the video recording mode. In this case, the controller 1103 may determine a video recording time based on a distance between a reference position and a current position of the touch input, and acquire a video having a determined length of time. For example, when the distance between the position of the touch input and the reference position is the first distance, a plurality of videos each having a first length of time (e.g., 0.5 seconds) may be acquired. If the distance between the reference position and the position of the touch input is the second distance, a plurality of videos each having a second length of time (e.g., 0.2 seconds) may be acquired.

In an embodiment, when the distance from the reference position to the position of the touch input is greater than or equal to the first distance, the controller 1103 may display an icon for capturing a snapshot (hereinafter, referred to as a snapshot icon). Specifically, when the distance from the reference position to the position of the touch input during video recording is greater than or equal to the first distance, the controller 1103 may display the snapshot icon. When an input to the snapshot icon is received, the controller 1103 may capture a snapshot of a displayed image. A specific example related thereto may be described with reference to FIG. 18.

Meanwhile, in an embodiment, capturing an image by the controller 1103 may include selecting information regarding a specific image from images continuously acquired on a buffer. In this manner of capturing an image, images acquired by a lens may be stored in the buffer and information on an image matching a capture condition in the stored images may be stored, and accordingly, it is possible to capture an image at a shorter cycle.

Figure 12:
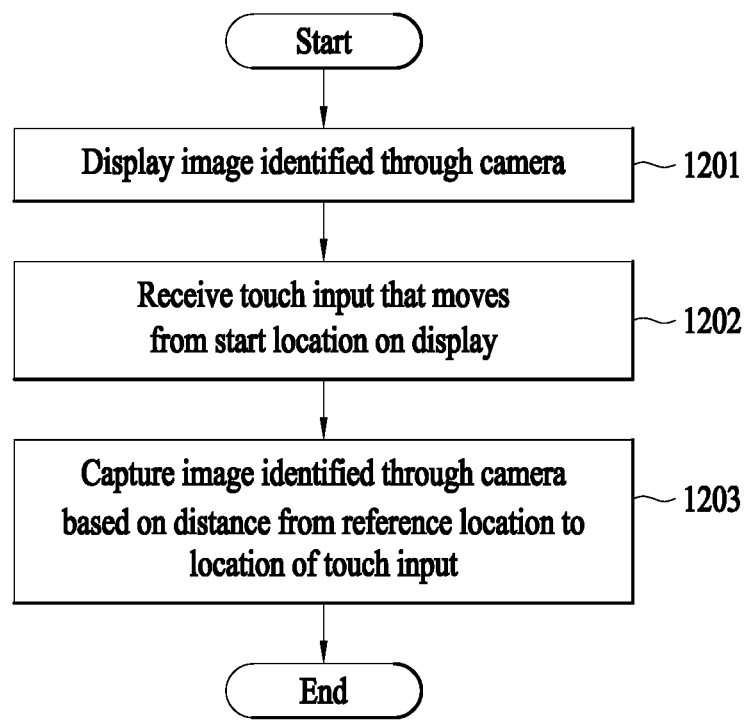
FIG. 12 is a diagram illustrating a flow of respective operations of a method for controlling a mobile terminal according to an embodiment of the present disclosure.

FIG. 12 is a diagram illustrating a flow of respective operations of a method for controlling a mobile terminal according to an embodiment of the present disclosure. The respective operations of the method illustrated in FIG. 12 may be performed in a different order from that depicted in the drawing or regardless of the order depending on a specific case. Hereinafter, a repeated description of the above-described embodiments may be omitted.

Referring to FIG. 12, in operation 1201, a mobile terminal may display an image identified by a camera. Specifically, the mobile terminal may display an image identified by the camera, for example, a preview image, on a display based on execution of the camera.

In operation 1202, the mobile terminal may receive a touch input moving from a start position on the display. In an embodiment, the mobile terminal may receive a touch input of which the position changes on the display. For example, the mobile terminal may receive a drag input. In this case, a position from which the touch input starts may correspond to the start position.

In an embodiment, the start position may be a specific position on a predetermined display. For example, the start position may be a position corresponding to a first icon or a position included in an area corresponding to the first icon.

In operation 1203, the mobile terminal may capture an image, identified by the camera, based on a distance from a reference position to a position of the touch input. For example, the mobile terminal may capture an image at a capture cycle, a focus area, or a depth of field, each corresponding to the distance between the position of the touch input and the reference position.

Here, the reference position is a predetermined position and may correspond to, for example, the start position. However, the present disclosure is not limited thereto, and the reference position may be a fixed position on the display or an arbitrary position on the display.

In an embodiment, when the distance from the reference position to the position of the touch input is a first distance, the mobile terminal may capture an image multiple times at a first cycle. If the distance from the reference position to the position of the touch input is a second distance, the mobile terminal may capture an image multiple times at a second cycle.

Meanwhile, the number of times of capturing an image at a cycle (e.g., the first cycle and the second cycle) determined according to the distance may be predetermined. For example, the mobile terminal may capture an image 10 times at the first cycle. However, the present disclosure is not limited thereto, and image capturing may be performed at the first cycle from a point in time when the distance is identified to a point in time until when the touch input is maintained.

According to an embodiment, the position of the touch input may change. In order to handle such a situation, the mobile terminal may identify the position of the touch input at a specific time interval. The mobile terminal may identify the distance between the reference position and the position of the touch input in response to identifying the position of the touch input, and change the cycle according to the identified distance.

In some cases, a mode for capturing an image at a specific cycle may be referred to as a continuous shooting mode, but the present embodiment is not limited to this term.

In an embodiment, when the distance from the reference position to the position of the touch input is greater than or equal to the first distance, the mobile terminal may capture an image based on a moving speed of an object included in the image. For example, when the distance from the reference position to the position of the touch input is equal to or greater than the first distance, the mobile terminal may identify the moving speed of the object included in the image. When the identified moving speed of the object is a first speed, the mobile terminal may capture the image at the first cycle, and when the identified moving speed of the object is a second speed, the mobile terminal may capture the image at a second cycle.

In an embodiment, when the distance from the reference position to the position of the touch input is greater than or equal to the first distance, the mobile terminal may capture a displayed image based on a cycle corresponding to a remaining capacity of a memory for storing images. For example, when the remaining capacity of the memory is a first capacity, the image may be captured at a first cycle, and when the remaining capacity of the memory is a second capacity, the image may be captured at a second cycle. Here, the first capacity may be smaller than the second capacity, and the first cycle may be longer than the second cycle. That is, when the remaining capacity of the memory is small, the image may be captured with a longer cycle.

In an embodiment, the mobile terminal may identify a direction (or a moving direction) of the touch input moving from the start position. The mobile terminal may adjust the focus of the camera in response to the identified direction of the touch input. For example, when the direction of the touch input is a first direction, the mobile terminal may adjust the focus of the camera to be included in a first area. When the direction of the touch input is a second direction, the mobile terminal may adjust the focus of the camera to be included in a second area. Here, the first area and the second area are predetermined areas and may be distinguished (or different) from each other.

For another example, when the direction of the touch input is the first direction, the mobile terminal may adjust the focus of the camera to correspond to an object located closer to the mobile terminal (or an object located at a distance less than the first distance from the mobile terminal). When the direction of the touch input is the second direction, the mobile terminal may adjust the focus of the camera to correspond to an object located far away from the mobile terminal (or an object located at a distance greater than or equal to the first distance from the mobile terminal). Here, the first area and the second area are predetermined areas and may be distinguished (or different) from each other.

In an embodiment, the mobile terminal may adjust the size of the image in response to the direction of the touch input. For example, when the direction of the touch input is the first direction, the mobile terminal may zoom in the image, and when the direction of the touch input is the second direction, the mobile terminal may zoom out the image. In this case, a zoom-in degree or a zoom-out degree of the image may be predetermined as a specific value or may be changed according to a moving distance of the touch input.

Figure 13:
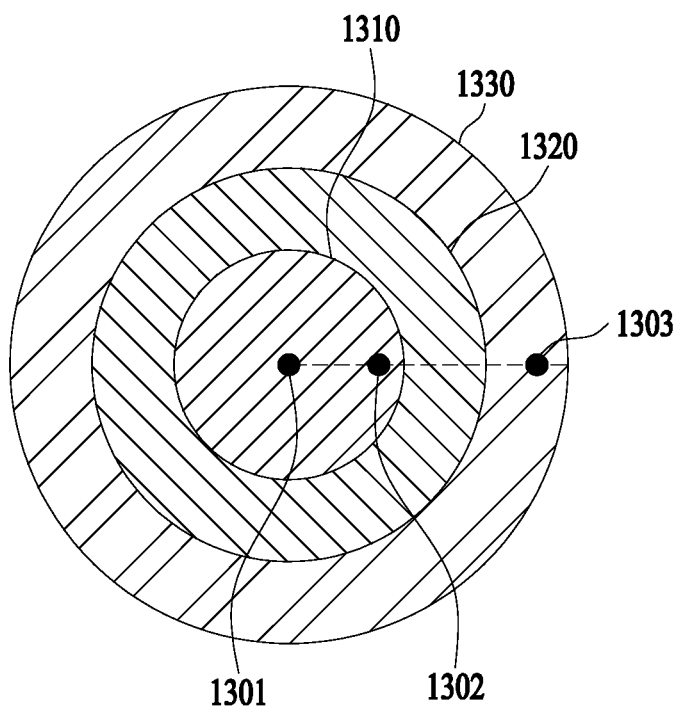
FIG. 13 is a diagram illustrating an input received from a mobile terminal according to an embodiment of the present disclosure.

FIG. 13 is a diagram illustrating an input received from a mobile terminal according to an embodiment of the present disclosure.

Referring to FIG. 13, an image capture cycle may be determined for each distance range from a start position 1301. Specifically, when a position of a touch input is included in a first range 1310 representing a first distance from the start position 1301, the image capture cycle may correspond to a first cycle. If the position of the touch input is out of the first range 1310 from the start position 1301 but included in a second range 1320 representing a second distance, the image capture cycle may correspond to a second cycle. When the position of the touch input is out of the second range 1320 from the start position 1301 but included in a third range 1330 representing a third distance, the image capture cycle may correspond to a third cycle.

In an embodiment, the reference position may correspond to the start position, but, in some cases, the reference position may correspond to a specific position distinguished from the start position, for example, a first position 1302. In this case, the mobile terminal receives a touch input moving from the start position 1301, and when the current position of the touch input corresponds to the second position 1303, an image may be captured based on the distance between the first position 1302 and the second position 1303.

Here, a touch input moving from the start position 1301 may be located at the second position 1303 through the first position 1302 from the start position 1301 in order.

Figure 14:
FIG. 14 is a diagram illustrating an example of displaying capture cycle information of a mobile terminal according to an embodiment of the present disclosure.

FIG. 14 is a diagram illustrating an example of displaying capture cycle information of a mobile terminal according to an embodiment of the present disclosure.

Referring to FIG. 14, a mobile terminal may display information regarding a capture cycle determined according to a distance from a reference position, that is, capture cycle information. The capture cycle information may indicate a distance range (e.g., the first range 1310, the second range 1320, and the third range 1330 of FIG. 13) that determines a cycle in FIG. 13. In this case, the first range 1310 of FIG. 13 may corresponds to a first range 1401 of FIG. 14, the second range 1320 of FIG. 13 may correspond to a second range 1402 of FIG. 14, and the third range 1330 of FIG. 13 may correspond to a third range 1403 of FIG. 14.

In an embodiment, the capture cycle information may be displayed corresponding to the reference position. For example, when the start position corresponds to a position at which a shutter icon is displayed and the reference position corresponds to the start position, the capture cycle information may be displayed corresponding to the position of the shutter icon.

In some cases, the capture cycle information may be displayed so that each distance range has a different color, pattern, or contrast, but not limited thereto.

In an embodiment, the capture cycle information may correspond to information on functions that are changeable according to a position of a touch input from a reference position, for example, information indicating a focus, a depth of field, and a zoom factor. Meanwhile, in an embodiment, an image indicating a focus may include at least one of: information regarding accuracy of the focus and information regarding a position that is in focus within the image. For convenience of explanation, the following description will be described by use of the capture cycle information, but the present disclosure is not limited thereto, and the capture cycle information may be construed as information indicating accuracy of the focus or a depth-of-field value depending on a distance according to an embodiment.

FIG. 15 is a diagram for explaining focus control of a mobile terminal according to an embodiment of the present disclosure.

Reference numeral 1501 of FIG. 15 indicates an example of a screen displayed on a display of a mobile terminal in response to execution of a camera. A first icon 1510 for capturing an image may be displayed on the display along with an image identified by the camera. The first icon 1510 may correspond to a shutter icon, for example. In this case, a touch input 1511 may be received on the first icon 1510.

In an embodiment, the touch input 1511 may include an input moving in a specific direction. Specifically, referring to reference numeral 1502, a touch input 1524 may include an input moving from a first position 1522 to a second position 1523.

In reference numeral 1502, the first position 1522 may correspond to a start position, a reference position may correspond to the start position, and the second position 1523 may correspond to a current position of the touch input 1524. In this case, the mobile terminal may identify a direction of the touch input 1524 based on the first position 1522 and the second position 1523. The mobile terminal may adjust the focus of the camera according to the identified direction.

Specifically, as shown in the drawing, when the direction of the touch input 1524 is a first direction, the mobile terminal may adjust the focus of the camera to correspond to a first area (e.g., a lower area) in the image or to an object (e.g., flower in the image of reference numeral 1502) located at a distance less than a first distance from the mobile terminal in the image.

Meanwhile, in some cases, the start position may include an arbitrary position in the first area 1521 corresponding to the first icon 1510, and the reference position may correspond to the central position of the first area 1521. In this case, the camera may be controlled (or an image may be captured) in response to receiving the touch input 1524 moving in a specific direction from the first icon 1510.

In an embodiment, the mobile terminal may capture an image displayed at a point in time when the touch input 1524 ends. For example, when the touch input 1524 ends at the second position 1523, an image of reference numeral 1502, which is displayed based on the touch input 1524 being located at the second position 1523, may be captured.

Referring to reference numeral 1503, in an embodiment, the touch input 1531 may move in a second direction. The second direction may include a direction facing reference numeral 1502. In this case, as illustrated, the mobile terminal may adjust the focus of the camera to correspond to a second area (e.g., an upper area) of the image or to an object (e.g., a person in the image of reference numeral 1502) located at a distance exceeding the first distance from the mobile terminal in the image.

Meanwhile, reference numerals 1502 and 1503 of FIG. 15 each indicate a case where capture cycle information is displayed corresponding to the first icon 1510. However, the present disclosure is not limited thereto, and the capture cycle information may be omitted according to an embodiment.

FIG. 16 is a diagram for explaining depth control of a mobile terminal according to an embodiment of the present disclosure.

Reference numeral 1601 of FIG. 16 indicates an example of a screen displayed on a display of a mobile terminal in response to execution of the camera. As shown, an image identified by a camera may be displayed on the display.

In an embodiment, the mobile terminal may identify an object included in the displayed image. For example, referring to reference numeral 1601, the mobile terminal may identify an object corresponding to a person in the displayed image based on execution of a camera mode for photographing a person. The mobile terminal may identify an object corresponding to the person based on feature analysis. Since a technique of identifying a person based on feature analysis is apparent to a person skilled in the art, a detailed information thereof will be omitted. However, in order to analyze an object corresponding to a person, a variety of well-known techniques may be used in addition to the above-described feature analysis technique.

The depth of field indicates a range in focus, and may indicate a portion in focus around an identified object. For example, when the depth of field is deep (or the depth-of-field value is large), a wider range around a person may be in focus, and therefore, a portion corresponding thereto may appear clearly. If the depth of field is shallow (or the depth-of-field value is small), a narrow range around a person may be in focus, and therefore, a portion other than the range in focus may appear blurred.

In an embodiment, the mobile terminal may receive a touch input 1611 moving from a start position 1621. The mobile terminal may identify a distance between a reference position and a position 1622 of the touch input 1611 in response to receiving the touch input 1611. The mobile terminal may capture an image based on a depth-of-field value corresponding to the identified distance. For example, the mobile terminal may display an image based on a depth-of-field value corresponding to the identified distance, and capture the displayed image in correspondence to a point in time when the touch input 1611 ends.

When the touch input 1611 ends at the position 1622 indicated by reference numeral 1602, the image indicated by reference numeral 1602 may be captured.

Meanwhile, the depth of field of the displayed image may be adjusted based on the distance between the reference position and the position 1622 of the touch input 1611.

In an embodiment, when the reference position corresponds to the start position 1621, information indicating a depth-of-field value for each distance may be displayed around the start position 1621 as illustrated. However, the present disclosure is not limited thereto, and information indicating a depth-of-field value may be omitted or displayed in a different form.

Figure 17:
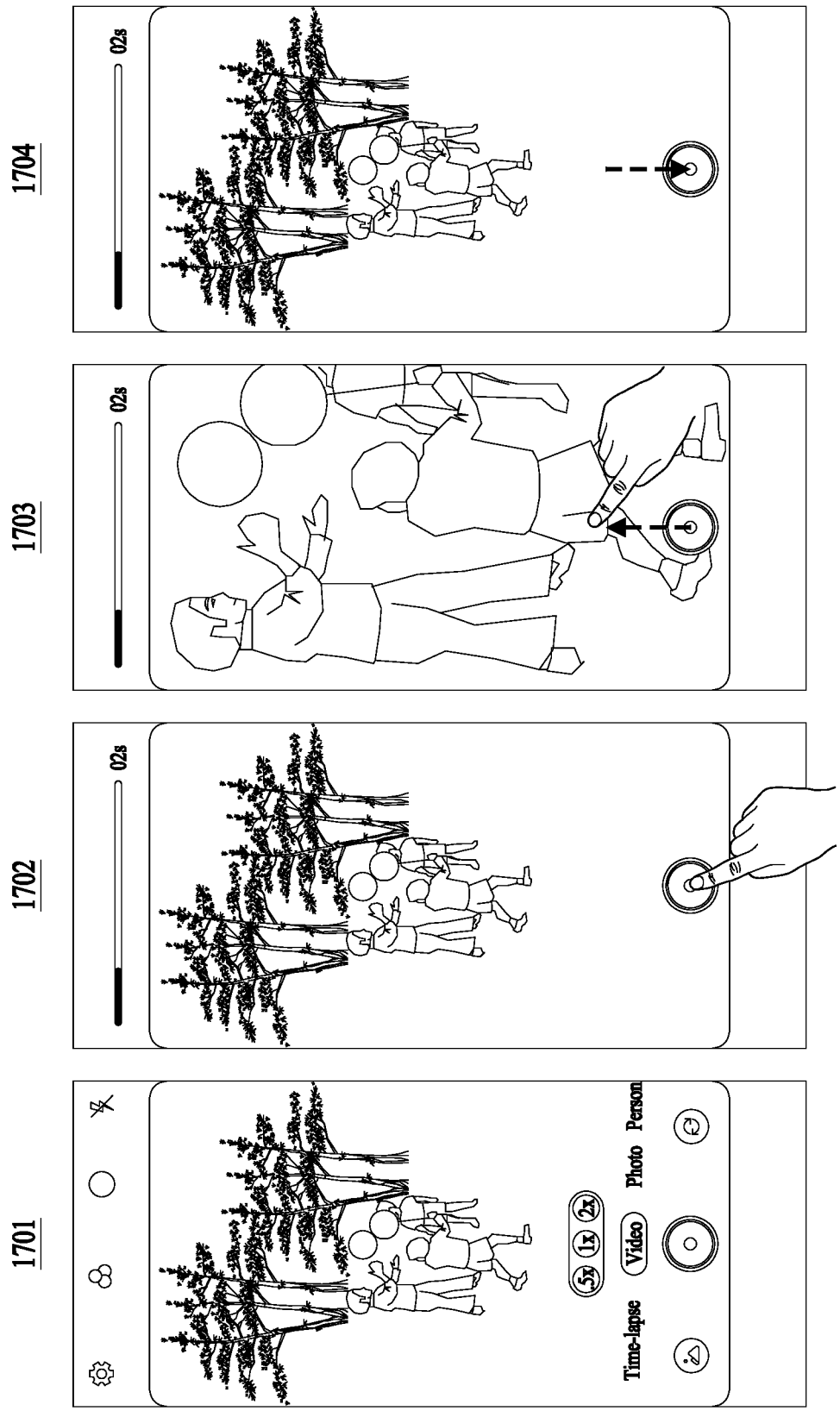
FIGS. 17 and 18 are diagrams for explaining an operation related to video recording by a mobile terminal according to an embodiment of the present disclosure.
Figure 18:
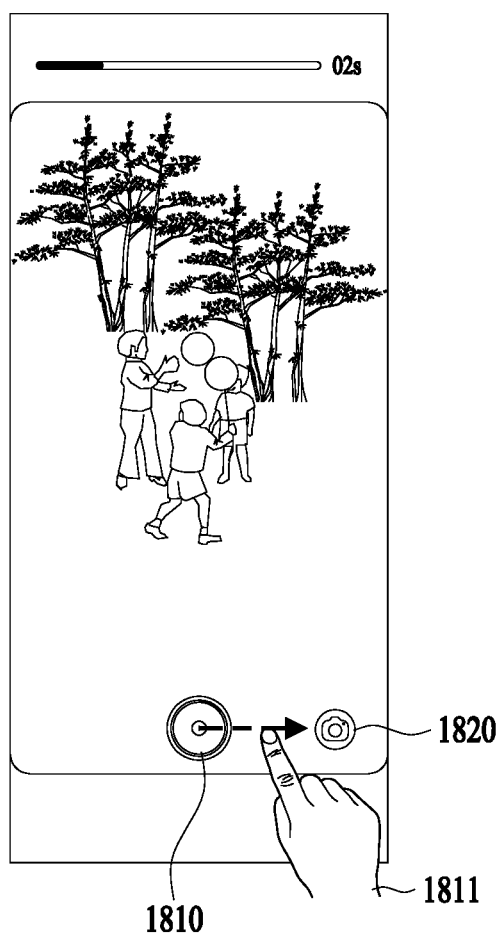

FIGS. 17 and 18 are diagrams for explaining an operation related to video recording by a mobile terminal according to an embodiment of the present disclosure.

FIG. 17 is a diagram for explaining a case where an image displayed according to an input moving from a starting position is zoomed in or out.

Reference numeral 1701 of FIG. 17 indicates an example of a screen displayed based on execution of a video recording mode. According to reference numeral 1710, a "video" icon may be displayed based on the execution of the video recording mode. When an input to a shutter icon is received in the video recording mode, video recording may proceed.

Referring to reference numeral 1702, when a first input for the shutter icon, for example, a long press input or a long touch input, is received, a video may be recorded at a specific time interval for a time during which the first input is maintained. For example, a video may be recorded at a time interval of 2 seconds during the time during which the first input is maintained.

In some cases, the mobile terminal may receive an input moving from a start position. For example, an input moving from the start position corresponding to the shutter icon, such as reference numeral 1703, may be received. The received input may include an input moving in a specific direction. In this case, the mobile terminal may zoom in or out the displayed image based on the direction of the input.

For example, in the case of reference numeral 1703, the displayed image may be zoomed in response to movement of the input in the first direction. If the input moves in a second direction again as shown in reference numeral 1704, the displayed image may be zoomed out. Meanwhile, zooming in the image may indicate a case where an image of a narrower area is displayed, and zooming out the image may indicate a case where an image of a wider area is displayed. In such cases, when the image is zoomed in, a specific object included in the image may be displayed larger, and when the image is zoomed out, a specific object included in the image may be displayed smaller.

In an embodiment, when a touch input moving from a start position is received during video recording, as shown in reference numeral 1702, a video recording time interval may be determined based on a distance between a reference position and a position of the touch input. For example, when the distance between the reference position and the position of the touch input is a first distance, a video of a first time unit may be recorded, and when the distance between the reference position and the position of the touch input is a second distance, a video of a second time unit may be recorded.

FIG. 18 is a diagram for explaining a case where a distance between a reference position and a position of a touch input during video recording is greater than or equal to a first distance.

Referring to FIG. 18, during video recording, for example, a process in which video recording proceeds as shown in reference numeral 1702 of FIG. 17, when a position of a touch input 1811 is greater than or equal to the first distance, an icon for capturing a snapshot, that is, a snapshot icon 1820, may be displayed.

In an embodiment, the reference position may correspond to a start position, and the start position may correspond to a first icon 1810, that is, a shutter icon, but not limited thereto.

In an embodiment, when an input to the snapshot icon 1820 is received while the snapshot icon 1820 is displayed as shown in FIG. 18, a snapshot corresponding to an image displayed during video recording may be captured. If an input to the snapshot icon 1820 is maintained for a specific time, a snapshot may be captured at a specific cycle interval for the specific time.

In an embodiment, an input moving from a position of the snapshot icon 1820 may be received. In this case, a snapshot capture cycle may be determined based on a distance between the position of the snapshot icon 1820 and the position of the received input. Snapshot capturing may be performed in response to the determination of the cycle. The snapshot capture cycle may be determined in a manner of corresponding to the determination of the image capture cycle related to the input moving from the start position. For example, the cycle may be determined according to a distance between the position of the snapshot icon 1820 and a position of a received input, and a snapshot may be captured in a specific cycle based on the determination of the distance.

The mobile terminal and the control method thereof according to an embodiment of the present disclosure may allow a function provided using a camera to be controlled more intuitively in response to a moving input, thereby improving convenience of a user regarding a camera function and capturing an image more effectively.

In addition, the mobile terminal and the control method thereof according to the exemplary embodiment of the present disclosure may allow the function of the camera to be more sophisticatedly controlled in response to a moving distance of an input, thereby providing a user with a variety of experience regarding image capturing.

However, the effects of the present disclosure are not limited to the aforementioned effects, and various other effects will be clearly understood by those skilled in the art from in the present specification.

The above description is merely illustrative of the technical idea of the present disclosure, and those skilled in the art to which the present disclosure pertains can make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. A mobile terminal, comprising:

a camera;

a display; and a controller configured to:

display, on the display, a preview image obtained by the camera and a first icon related to control of the camera;

receive a user input, wherein the user input comprises a touch drag input moving from a first position on the first icon in any direction;

display, in response to receiving the user input, a second icon in the form of a concentric circle on the display; and in response to ending the touch drag input, capture one or more images, via the camera, based on a distance from a predetermined reference position to an end position of the touch drag input.

2. The mobile terminal of claim 1, wherein the predetermined reference position corresponds to a central position of the concentric circle on the display.

3. The mobile terminal of claim 1, wherein the controller is further configured to capture the one or more images, via the camera, based on a burst capture setting corresponding to the distance from the predetermined reference position to the end position.

4. The mobile terminal of claim 3, wherein a rate of the burst capture setting is increased as the distance from the predetermined reference position to the end position of the touch drag input increases.

5. The mobile terminal of claim 1, wherein the controller is further configured to cause the camera to capture the one or more images based on a burst capture setting corresponding to a moving speed of at least one object included in the displayed preview image when the distance from the predetermined reference position to the end position is greater than a first distance.

6. The mobile terminal of claim 1, wherein the controller is further configured to cause the camera to capture the one or more images based on a burst capture setting corresponding to a remaining capacity of a memory for storing images when the distance from the predetermined reference position to the end position is greater than a first distance.

7. The mobile terminal of claim 1, wherein a start position of the touch drag input and the predetermined reference position are located within a first area where a first icon is displayed.

8. The mobile terminal of claim 1, wherein the controller is further configured to adjust a focus of the camera based on a direction of the touch drag input.

9. The mobile terminal of claim 1, wherein the controller is further configured to capture the one or more images, via the camera, based on a depth of field corresponding to the distance from the predetermined reference position to the end position.

10. The mobile terminal of claim 1, wherein the controller is further configured to display, via the display, burst capture setting information by using the second icon.

11. The mobile terminal of claim 1, wherein the controller is further configured to zoom in or out of the displayed preview image according to a direction of the touch drag input.

12. The mobile terminal of claim 1, wherein the controller is further configured to display, via the display, an icon for capturing a snapshot during video recording when the distance from the predetermined reference position to the end position is greater than or equal to a first distance.

13. The mobile terminal of claim 1, wherein the display is located at a first side of the mobile terminal and a second side of the mobile terminal opposite the first side.

14. A control method of a mobile terminal, the method comprising:

displaying, on a display, a preview image obtained by a camera and a first icon related to control of the camera;

receiving a using input, wherein the user input comprises a touch drag input moving from a first position on the first icon in any direction via the display;

displaying, in response to receiving the user input, a second icon in the form of a concentric circle on the display; and in response to ending the touch drag input, capturing one or more images, via the camera, based on a distance from a predetermined reference position to an end position of the touch drag input.

15. The method of claim 14, wherein the predetermined reference position corresponds to a central position of the concentric circle start position of the touch drag input or a predetermined position on the display.

16. The method of claim 14, wherein the capturing comprises capturing the one or more images based on a burst capture setting corresponding to the distance from the predetermined reference position to the end position.

17. The method of claim 14, wherein the capturing comprises capturing the one or more images based on a burst capture setting corresponding to a moving speed of at least one object included in the displayed preview image when the distance from the predetermined reference position to the end position is greater than a first distance.

18. The method of claim 14, wherein the capturing comprises capturing the one or more images based on a burst capture setting corresponding to a remaining capacity of a memory for storing images when the distance from the predetermined reference position to the end position is greater than a first distance.

19. The method of claim 14, further comprising adjusting a focus of the camera based on a direction of the touch drag input.

20. The method of claim 14, wherein the capturing comprises capturing the image based on a depth of field corresponding to the distance from the predetermined reference position to the end position.

* * * * *